US012388993B2

(12) United States Patent
Lee et al.

(10) Patent No.: US 12,388,993 B2
(45) Date of Patent: Aug. 12, 2025

(54) GEOMETRIC PARTITIONING REFINEMENT

(71) Applicant: Ofinno, LLC, Reston, VA (US)

(72) Inventors: Young-Yoon Lee, McLean, VA (US);
Tae Meon Bae, McLean, VA (US);
Damian Ruiz Coll, Reston, VA (US);
Kalyan Goswami, Reston, VA (US)

(73) Assignee: Ofinno, LLC, Reston, VA (US)

( * ) Notice: Subject to any disclaimer, the term of this patent is extended or adjusted under 35 U.S.C. 154(b) by 125 days.

(21) Appl. No.: 17/707,588

(22) Filed: Mar. 29, 2022

(65) Prior Publication Data

US 2022/0312010 A1 Sep. 29, 2022

Related U.S. Application Data

(60) Provisional application No. 63/167,190, filed on Mar. 29, 2021.

(51) Int. Cl.
| | | |
|---|---|---|
| *H04N 19/189* | (2014.01) | |
| *H04N 19/105* | (2014.01) | |
| *H04N 19/119* | (2014.01) | |
| *H04N 19/167* | (2014.01) | |
| *H04N 19/176* | (2014.01) | |
| *H04N 19/96* | (2014.01) | |

(52) U.S. Cl.
CPC ......... *H04N 19/119* (2014.11); *H04N 19/105* (2014.11); *H04N 19/167* (2014.11); *H04N 19/176* (2014.11); *H04N 19/96* (2014.11)

(58) Field of Classification Search
CPC .. H04N 19/119; H04N 19/105; H04N 19/167; H04N 19/176; H04N 19/96
See application file for complete search history.

(56) References Cited

U.S. PATENT DOCUMENTS

| 2017/0318313 | A1* | 11/2017 | Merkle | ............... H04N 19/176 |
| 2020/0389656 | A1* | 12/2020 | Huang | .................. H04N 19/70 |
| 2022/0312010 | A1* | 9/2022 | Lee | ..................... H04N 19/176 |
| 2022/0329822 | A1* | 10/2022 | Chang | .................... H04N 19/46 |

FOREIGN PATENT DOCUMENTS

WO 2008/016605 A2 2/2008

OTHER PUBLICATIONS

Bläser et al.; Geometry-based Partitioning for Predictive Video Coding with Transform Adaptation; 2018 Picture Coding Symposium (PCS); Jun. 24-27, 2018; IEEE; San Francisco, CA, USA.
(Continued)

*Primary Examiner* — Howard D Brown, Jr.
(74) *Attorney, Agent, or Firm* — Arash Sayyah; Kavon Nasabzadeh; Jacob L. Mangan

(57) ABSTRACT

In some embodiments, a decoder may receive, from a bit stream, a residual of a block and an indication that the residual was determined based on a refined partition edge. The decoder may determine the refined partition edge based on the indication and reference samples neighboring the block. The decoder may determine based on at least one prediction mode, a prediction for two parts of the block defined by the refined partition edge. The decoder may determine a reconstruction for the block based on the residual and the prediction of the block.

20 Claims, 21 Drawing Sheets

(56) References Cited

OTHER PUBLICATIONS

Gao et al.; Advanced Geometric-based Inter Prediction for Versatile Video Coding; Huawei Technologies, Technical University of Munich, Alibaba Group, Qualcomm Inc; 2020 Data Compression Conference (DCC); Mar. 24-27, 2020; Snowbird, UT, USA.

Escoda et al.; Geometry-Adaptive Block Partitioning for Video Coding; 2007 IEEE International Conference on Acoustics, Speech and Signal Processing—ICASSP '07; Apr. 15-20, 2007; IEEE; Honolulu, HI, USA.

Ferreira et al.; Efficiency Improvements for a Geometric-Partition-Based Video Coder; 2009 16th IEEE International Conference on Image Processing (ICIP); Nov. 7-10, 2009; IEEE; Cairo, Egypt.

Kang et al.; Geometry-based Block Partitioning for Efficient Intra Prediction in Depth Video Coding; Visual Information Processing and Communication, SPIE vol. 7543, 75430A; IS&T/SPIE Electronic Imaging, 2010; San Jose, California, USA; Jan. 18, 2010.

Lee et al.; Fast Decision Method of Geometric Partitioning Mode and Block Partitioning Mode using Hough Transform in VVC; Journal of Broadcast Engineering; vol. 25, Issue 5; pp. 698-708; Published: Sep. 30, 2020.

Meng et al.; Edge-Directed Geometric Partitioning for Versatile Video Coding; 2020 IEEE International Conference on Multimedia and Expo (ICME); Jul. 6-10, 2020; IEEE; London, UK.

Gao et al.; Geometric Partitioning Mode in Versatile Video Coding: Algorithm Review and Analysis; IEEE Transactions on Circuits and Systems for Video Technology (vol. 31, Issue: 9); Nov. 24, 2020.

JVET-O 0522; Joint Video Experts Team (JVET) of ITU-T SG 16 WP 3 and ISO/IEC JTC 1/SC 29/WG 11; 15th Meeting: Gothenburg, SE, Jul. 3-12, 2019; Title: Non-CE4: CIIP using triangular partitions; Status: Input document to JVET; Purpose: Proposal.

JVET-P0884-v5; Joint Video Experts Team (JVET) of ITU-T SG 16 WP 3 and ISO/IEC JTC 1/SC 29/WG 11; 16th Meeting: Geneva, CH, Oct. 1-11, 2019; Title: Simplified GEO without multiplication and minimum blending mask storage (harmonization of JVET-P0107, JVET-P0264 and JVET-P0304); Status: Input document to JVET; Purpose: Proposal.

JVET-P0885-v4; Joint Video Experts Team (JVET) of ITU-T SG 16 WP 3 and ISO/IEC JTC 1/SC 29/WG 11; 16th Meeting: Geneva, CH, Oct. 1-11, 2019; Title: Simplified GEO without multiplication and minimum blending mask storage (harmonization of JVET-P0107, JVET-P0264 and JVET-P0304); Status: Input document to JVET; Purpose: Proposal.

JVET-Q0078; Joint Video Experts Team (JVET) of ITU-T SG 16 WP 3 and ISO/IEC JTC 1/SC 29/WG 11; 17th Meeting: Brussels, BE, Jan. 7-17, 2020; Title: CE4-6: Combination of geometric partitioning and CIIP; Status: Input document to JVET; Purpose: Proposal.

* cited by examiner

The quick brown fox jumps over the lazy dog. The quick brown fox jumps over the lazy dog. The quick brown fox jumps over the lazy dog.

FIG. 16

GEOMETRIC PARTITIONING REFINEMENT

CROSS-REFERENCE TO RELATED APPLICATIONS

This application claims the benefit of U.S. Provisional Application No. 63/167,190, filed Mar. 29, 2021, which is hereby incorporated by reference in its entirety.

BRIEF DESCRIPTION OF THE DRAWINGS

Examples of several of the various embodiments of the present disclosure are described herein with reference to the drawings.

FIG. 16 illustrates an example of IBC applied for screen content in accordance with embodiments of the present disclosure.

DETAILED DESCRIPTION

Figure 1:
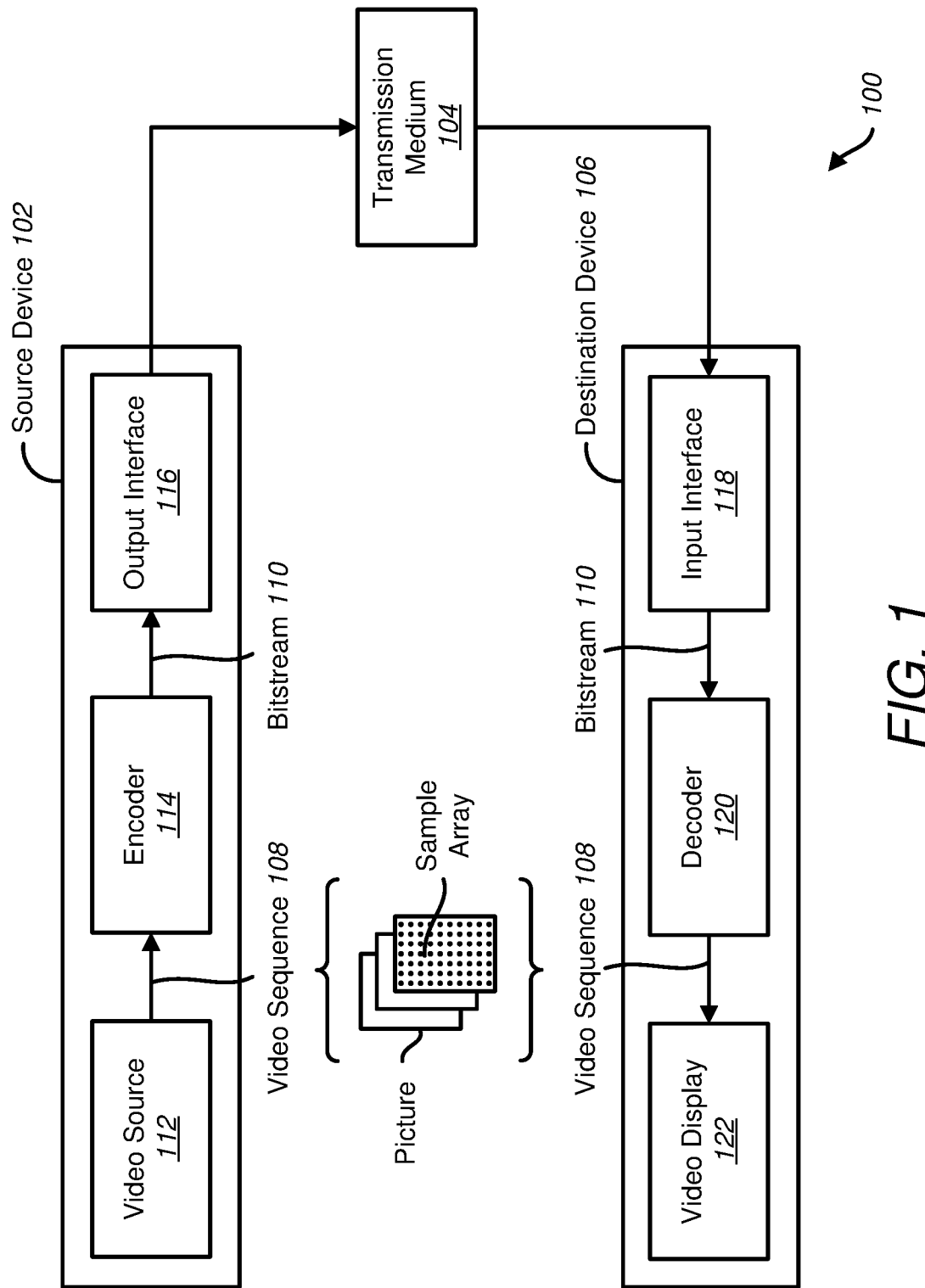
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into a bitstream 110 for more efficient storage and/or transmission. Source device 102 may store and/or transmit bitstream 110 to destination device 106 via transmission medium 104. Destination device 106 decodes bitstream 110 to display video sequence 108. Destination device 106 may receive encoded bit stream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming bitstream 110 to further reduce the number of bits needed to store and/or transmit video sequence 108.

Output interface 116 may be configured to write and/or store bitstream 110 onto transmission medium 104 for transmission to destination device 106. In addition or alternatively, output interface 116 may be configured to transmit, upload, and/or stream bitstream 110 to destination device 106 via transmission medium 104. Output interface 116 may comprise a wired and/or wireless transmitter configured to transmit, upload, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode bitstream 110 into video sequence 108 for display, destination device 106 may comprise an input interface 118, a decoder 120, and a video display 122. Input interface 118 may be configured to read bitstream 110 stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as those mentioned above.

Decoder 120 may decode video sequence 108 from encoded bit stream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in encoded bit stream 110 and determine the prediction errors using transform coefficients also received in encoded bit stream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bit stream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display device 122 may be external to destination device 106 or omitted altogether where video sequence is intended for consumption by a machine and/or storage device. In another example, source device 102 may further comprise a video decoder and destination device 104 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
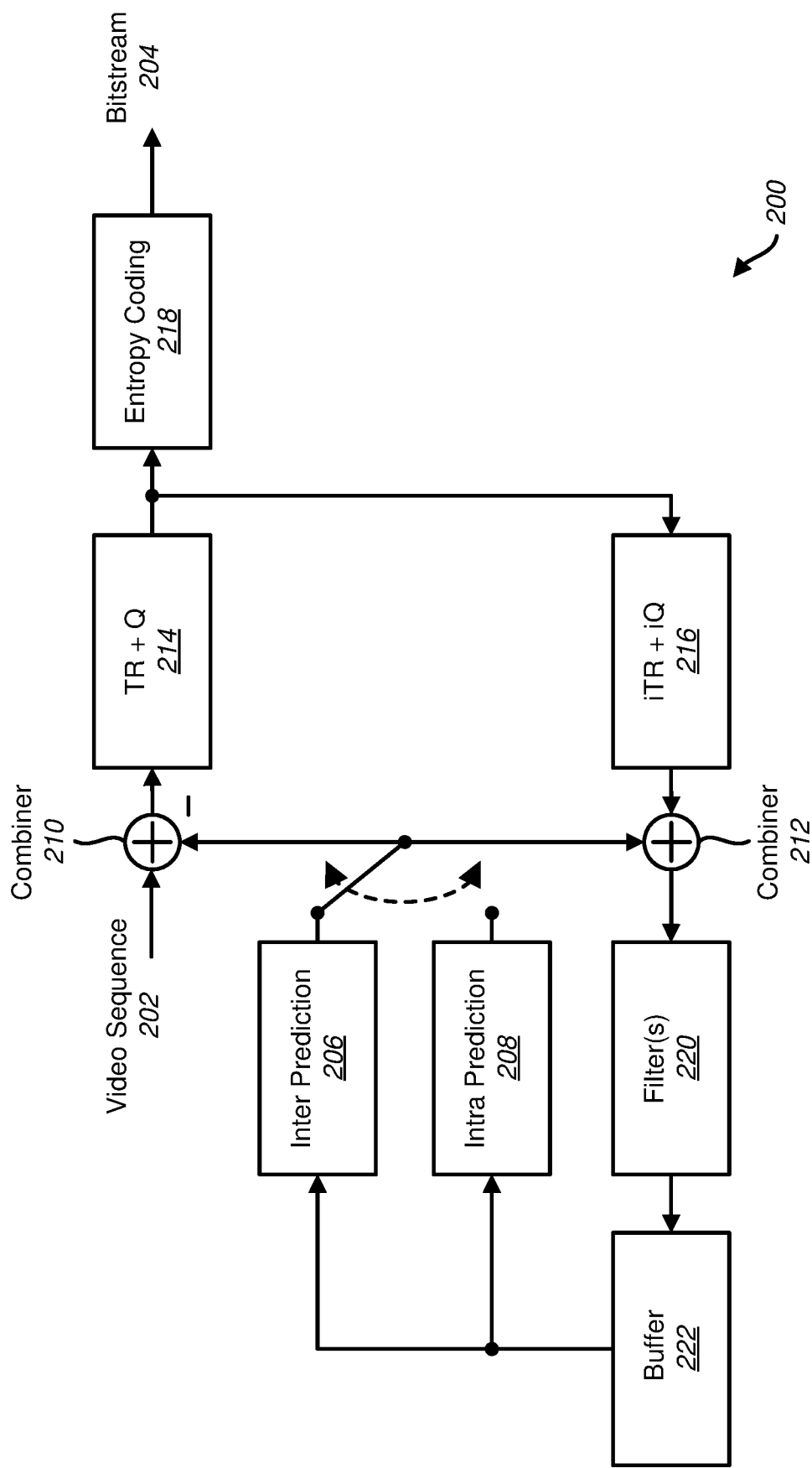
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into a bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that bitstream 204 is generated in conformance with the requirements of any one of a number of proprietary or industry video coding standards. For example, The encoder control unit may control the one or more units of encoder 200 such that bitstream 204 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of bitstream 204 and maximize or increase the reconstructed video quality. For example, the encoder control unit may attempt to minimize or reduce the bitrate of bitstream 204 given a level that the reconstructed video quality may not fall below, or attempt to maximize or increase the reconstructed video quality given a level that the bit rate of bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
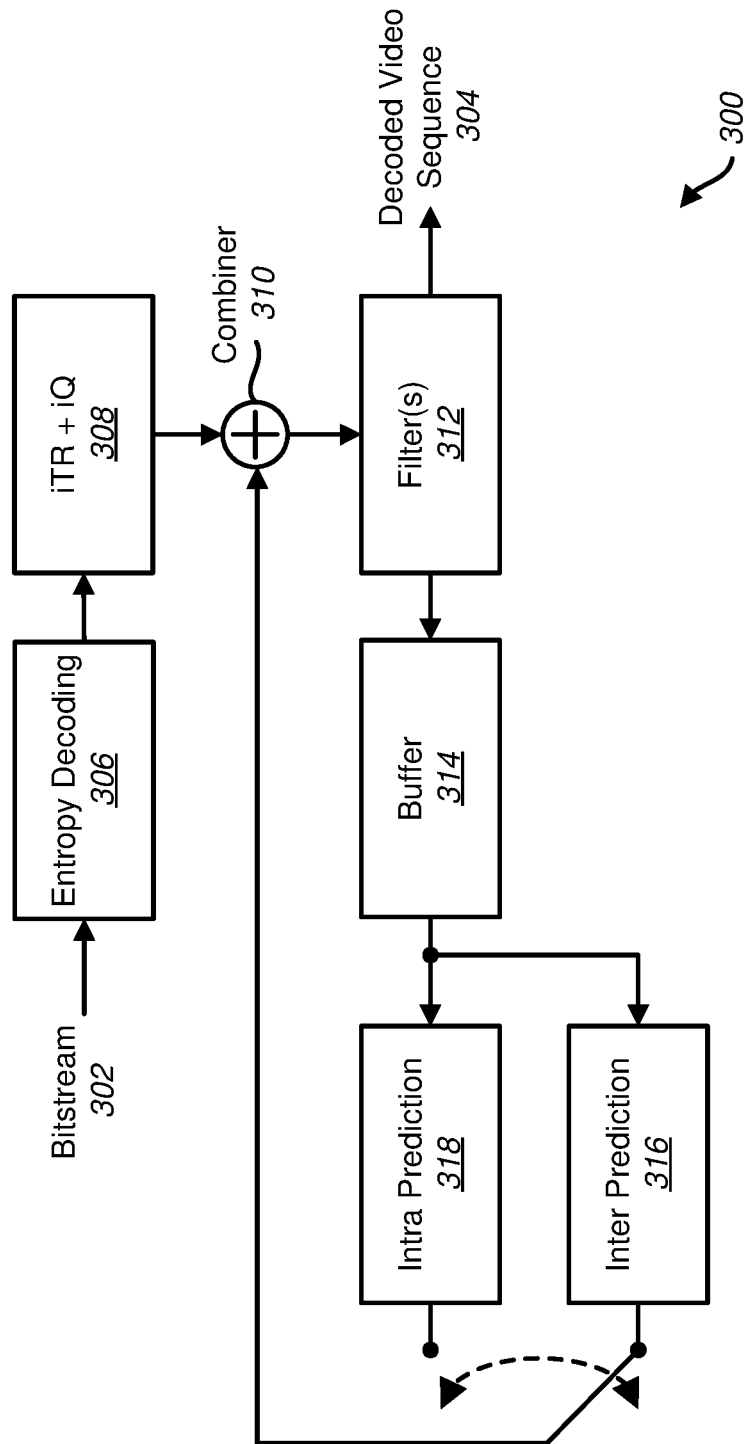
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that bitstream 302 is decoded in conformance with the requirements of any one of a number of proprietary or industry video coding standards. For example, The decoder control unit may control the one or more units of decoder 300 such that bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in bitstream 302.

Entropy decoding unit 306 may entropy decode the bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
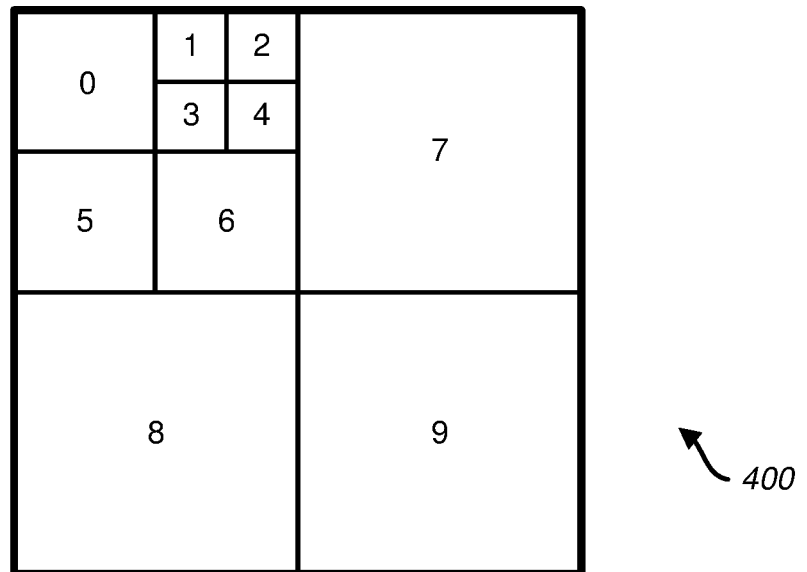
FIG. 4 illustrates an example quadtree partitioning of a coding tree block (CTB) in accordance with embodiments of the present disclosure.
Figure 5:
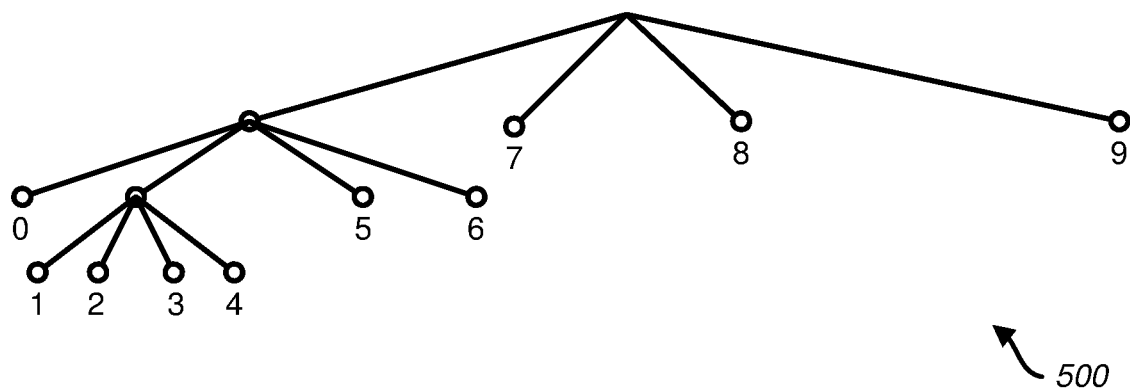
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
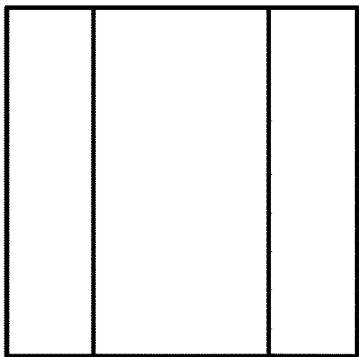
FIG. 6 illustrates example binary and ternary tree partitions in accordance with embodiments of the present disclosure.
Figure 6:
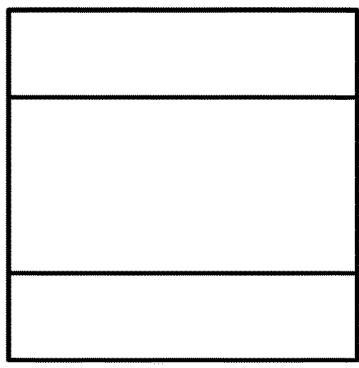
Figure 6:
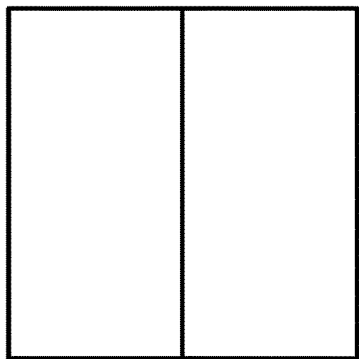
Figure 6:
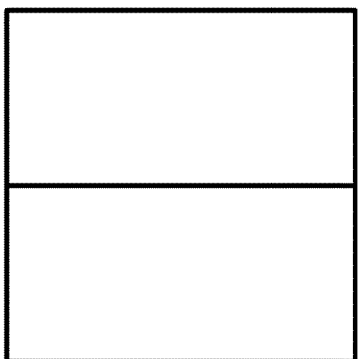

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
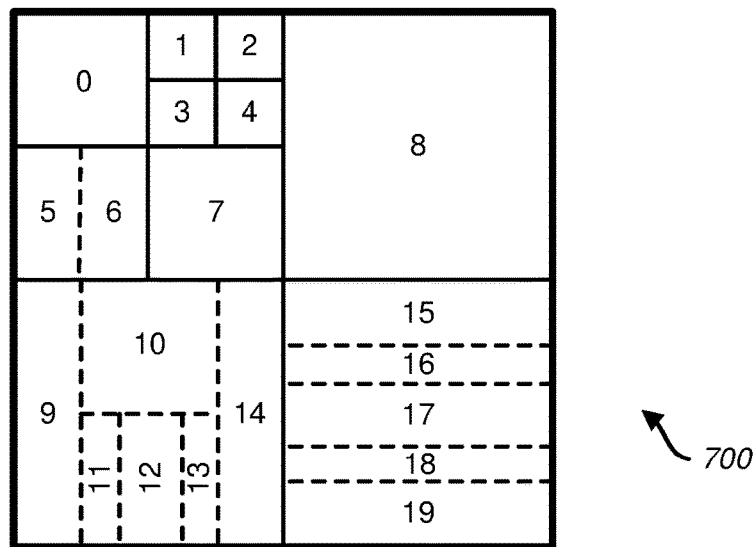
FIG. 7 illustrates an example quadtree+multi-type tree partitioning of a CTB in accordance with embodiments of the present disclosure.
Figure 8:
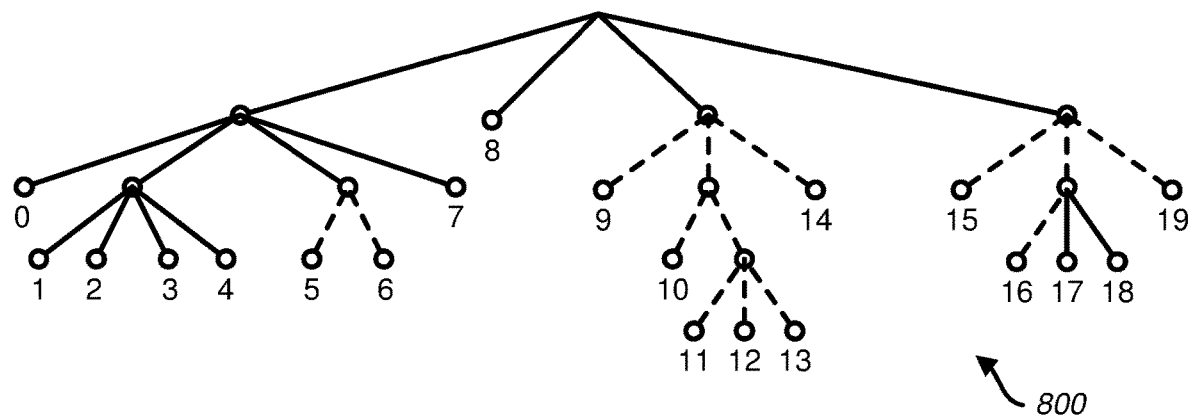
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
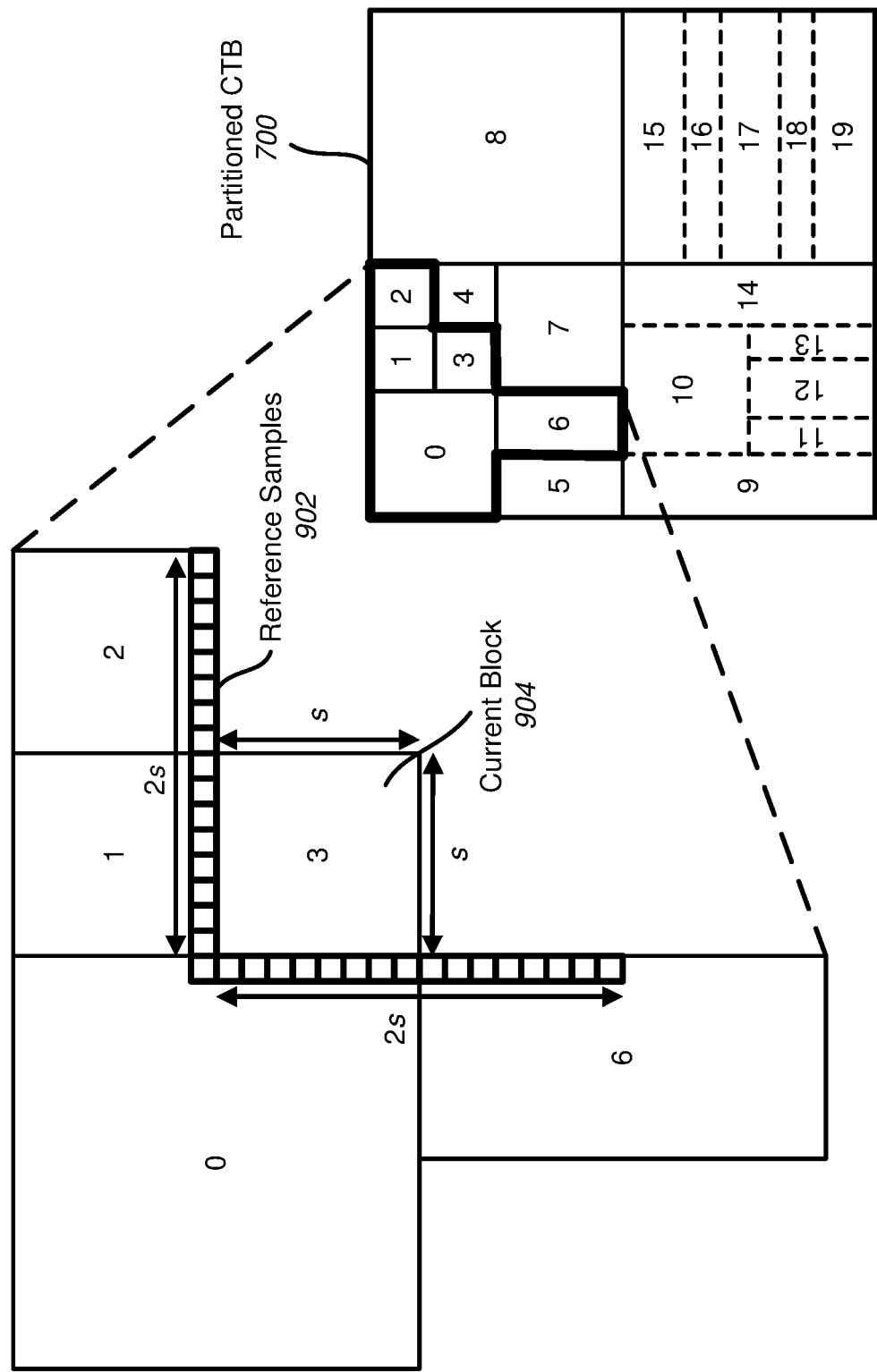
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
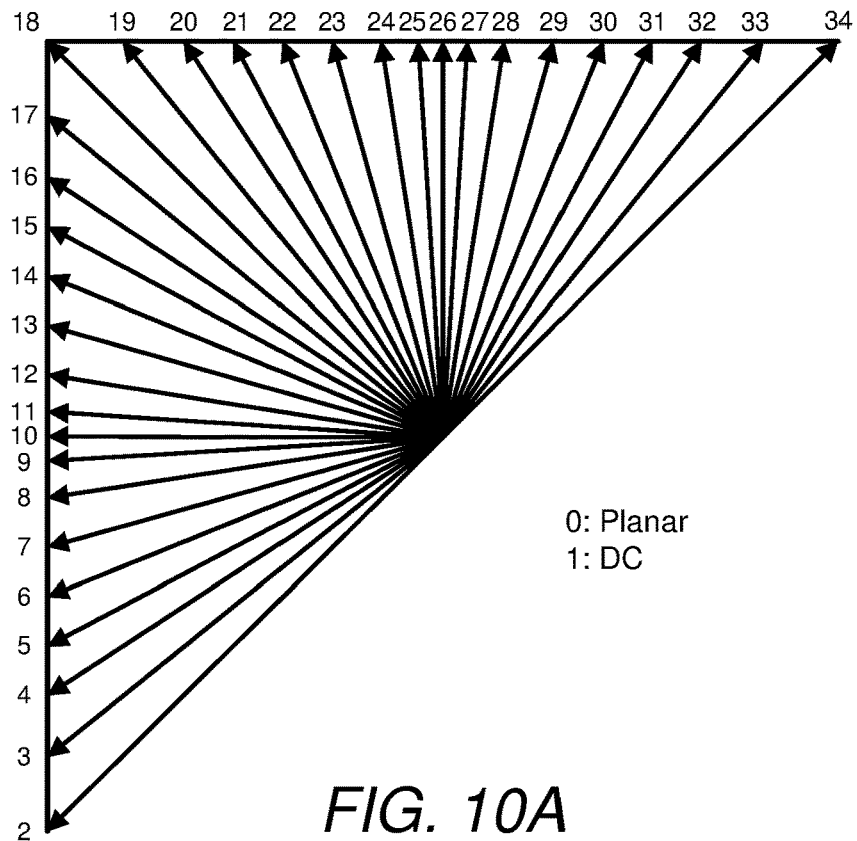
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
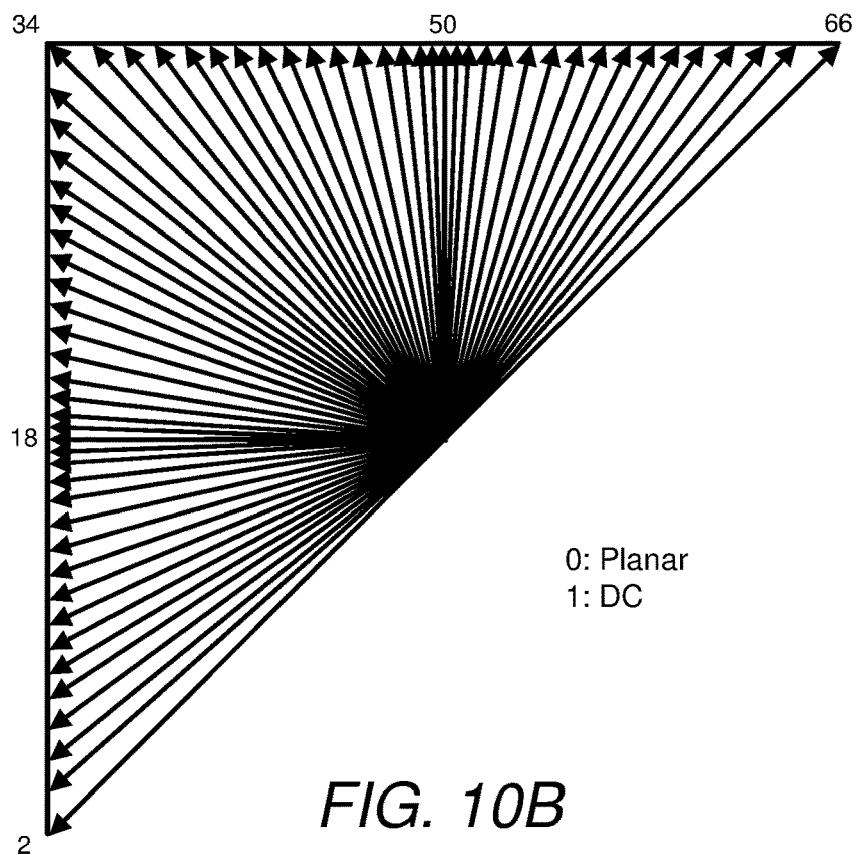
FIG. 10B illustrates the 67 intra prediction modes supported by HEVC in accordance with embodiments of the present disclosure.

FIG. 10B illustrates the 67 intra prediction modes supported by VVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
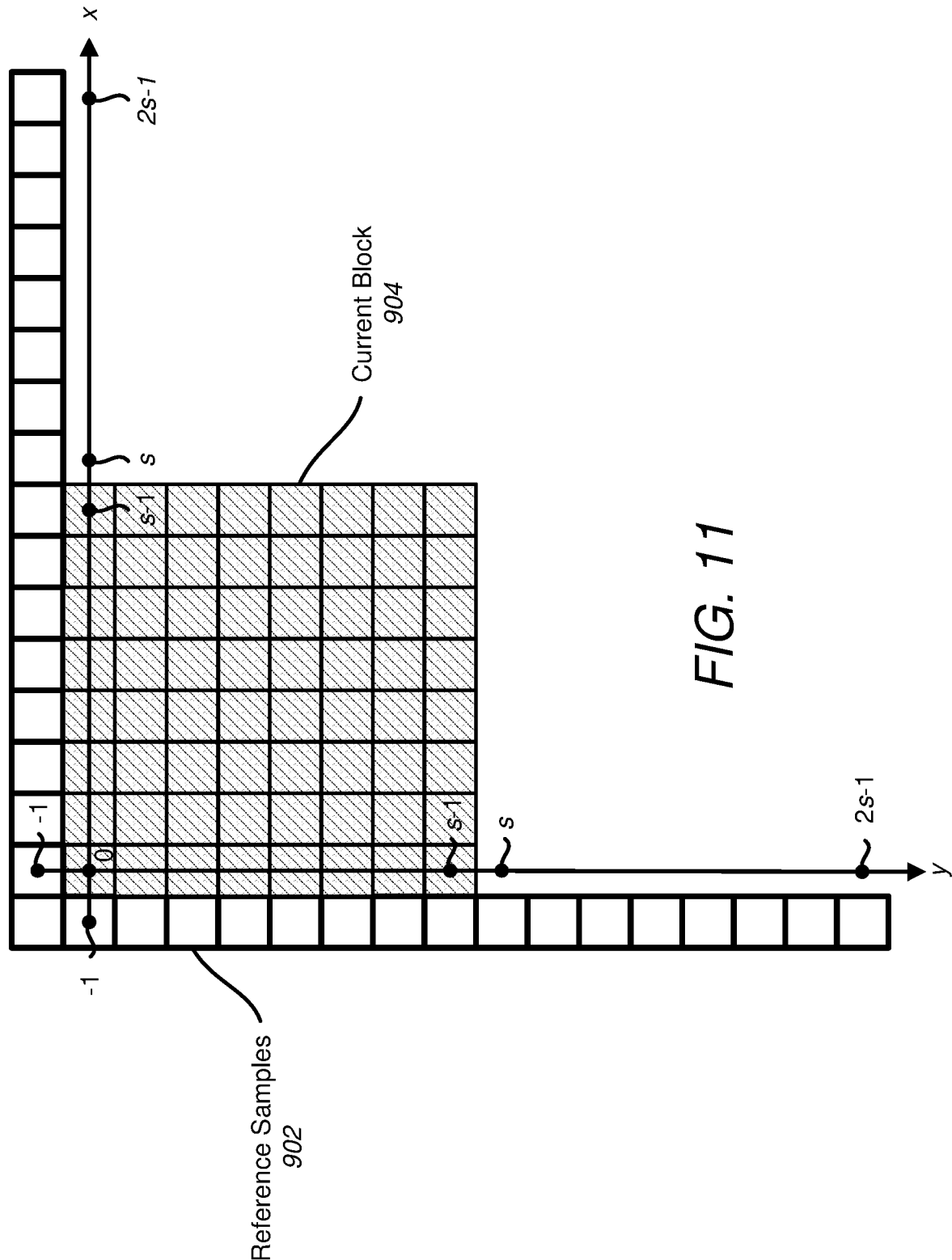
FIG. 11 illustrates the current block and reference samples from FIG. 9 in a two-dimensional x, y plane in accordance with embodiments of the present disclosure.
Figure 12:
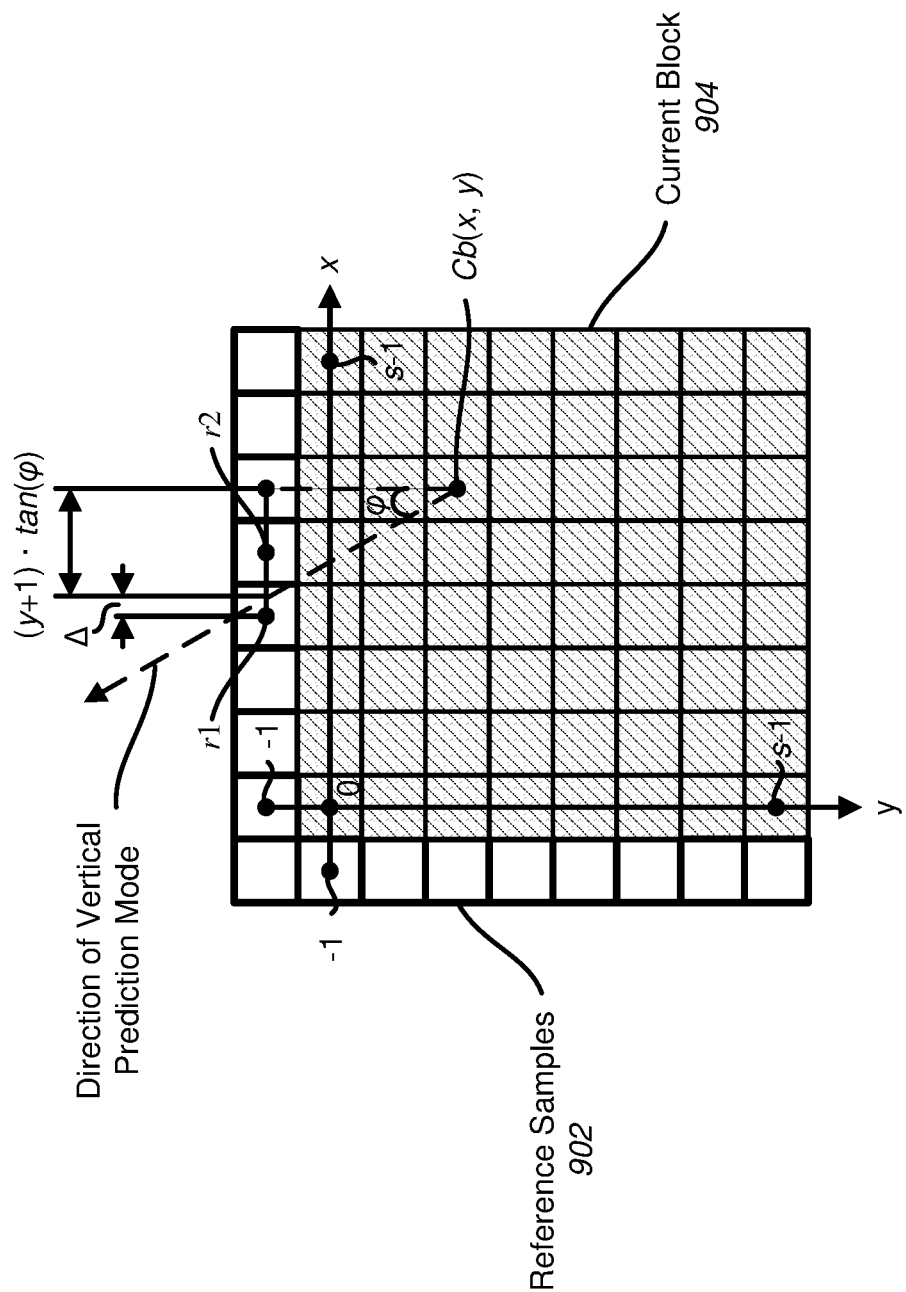
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane. Current block 904 is referred to as Cb, where Cb(x, y) denotes the predicted value of current block 904 at the coordinates (x, y). Reference samples 902 are referred to as r, where r(x, y) denotes the reference sample of reference samples 902 at the coordinates (x, y).

For planar mode, a sample in Cb may be predicted by calculating the mean of two interpolated values. The first of the two interpolated values may be based on a horizontal linear interpolation of the predicted sample in Cb. The second of the two interpolated values may be based on a vertical linear interpolation of the predicted sample in Cb. The predicted value of the sample in Cb may be calculated as $$Cb(x, y) = \frac{1}{2 \cdot s}(h(x, y) + v(x, y) + s) \quad (1)$$

where $$h(x, y) = (s - x - 1) \cdot r(-1, y) + (x + 1) \cdot r(s, -1) \quad (2)$$

may be the horizontal linear interpolation of the predicted sample in Cb and $$v(x,y)=(s-y-1) \cdot r(x,-1)+(y+1) \cdot r(-1,s) \quad (3)$$

may be the vertical linear interpolation of the predicted sample in Cb.

For DC mode, a sample in Cb may be predicted by the mean of the reference samples. The predicted value of the sample in Cb may be calculated as $$Cb(x, y) = \frac{1}{2 \cdot s} \cdot \left( \sum_{x=0}^{s-1} r(x, -1) + \sum_{y=0}^{s-1} r(-1, y) \right) \quad (4)$$

A boundary filter may be applied to boundary samples in Cb to smooth the transition between the boundary samples and their respective adjacent neighboring reference sample(s) in r.

For angular modes, a sample in Cb may be predicted by projecting the position of the sample in a direction specified by a given angular mode to a point on the horizontal or vertical axis comprising the reference samples r. The sample may be predicted by interpolating between the two closest reference samples in r of the projection point if the projection does not fall directly on a reference sample in r. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a sample in Cb predicted for a vertical prediction mode. For vertical prediction modes, the position (x, y) of the sample in Cb is projected onto the horizontal axis comprising reference samples r. Because the projection falls between two reference samples r1 and r2 in the example of FIG. 12, the predicted value of the sample in Cb may be calculated as the linear interpolation between the two reference samples r1 and r2 as $$Cb(x,y)=(1-\Delta) \cdot r1+\Delta \cdot r2 \quad (5)$$

where $$r1=r(x+\lfloor (y+1) \cdot \tan \varphi \rfloor,-1), \quad (6)$$

$$r2=r(x+\lfloor (y+1) \cdot \tan \varphi \rfloor+1,-1), \quad (7)$$

$$\Delta=((y+1) \cdot \tan \varphi)-\lfloor (y+1) \cdot \tan \varphi \rfloor, \text{ and} \quad (8)$$

$$\lfloor \cdot \rfloor \text{ is an integer floor.} \quad (9)$$

It should be noted that the weighting factors (1−Δ) and Δ may be calculated with some predefined level of precision, such as 1/32 pixel precision. To avoid floating point operations while preserving the specified precision, the weighting factors (1−Δ) and Δ may be multiplied by the reciprocal of the specified precision used and then divided by the reciprocal using, for example, right shift operations. It should be further noted that supplementary reference samples may be constructed for the case where the position (x, y) of a sample Cb to predicted is projected to a negative x coordinate, which happens with negative angles φ. The supplementary reference samples may be constructed by projecting the reference samples in r on the vertical axis to the horizontal axis using the angle φ. Finally, it should be further noted that a sample in Cb may be predicted for a horizontal prediction mode in a similar manner as discussed above for vertical prediction modes. For horizontal prediction modes, the position (x, y) of the sample in Cb may be projected onto the vertical axis comprising reference samples r and the angle φ may be defined relative to the x-axis. Supplemental reference samples may be similarly constructed for horizontal prediction modes by projecting the reference samples in r on the horizontal axis to the vertical axis using the angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error to a decoder for decoding of the current block.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

As explained above, intra prediction may exploit correlations between spatially neighboring samples in the same picture of a video sequence to perform video compression. Inter prediction is another coding tool that may be used to exploit correlations in the time domain between blocks of samples in different pictures of the video sequence to perform video compression. In general, an object may be seen across multiple pictures of a video sequence. The object may move (e.g., by some translation and/or affine motion) or remain stationary across the multiple pictures. A current block of samples in a current picture being encoded may therefore have a corresponding block of samples in a previously decoded picture that accurately predicts the current block of samples. The corresponding block of samples may be displaced from the current block of samples due to movement of an object, represented in both blocks, across the respective pictures of the blocks. The previously decoded picture may be referred to as a reference picture and the corresponding block of samples in the reference picture may be referred to as a reference block or motion compensated prediction. An encoder may use a block matching technique to estimate the displacement (or motion) and determine the reference block in the reference picture.

Similar to intra prediction, once a prediction for a current block is determined and/or generated using inter prediction, an encoder may determine a difference between the current block and the prediction. The difference may be referred to as a prediction error or residual. The encoder may then store and/or signal in a bitstream the prediction error and other related prediction information for decoding or other forms of consumption. A decoder may decode the current block by predicting the samples of the current block using the prediction information and combining the predicted samples with the prediction error.

Figure 13A:
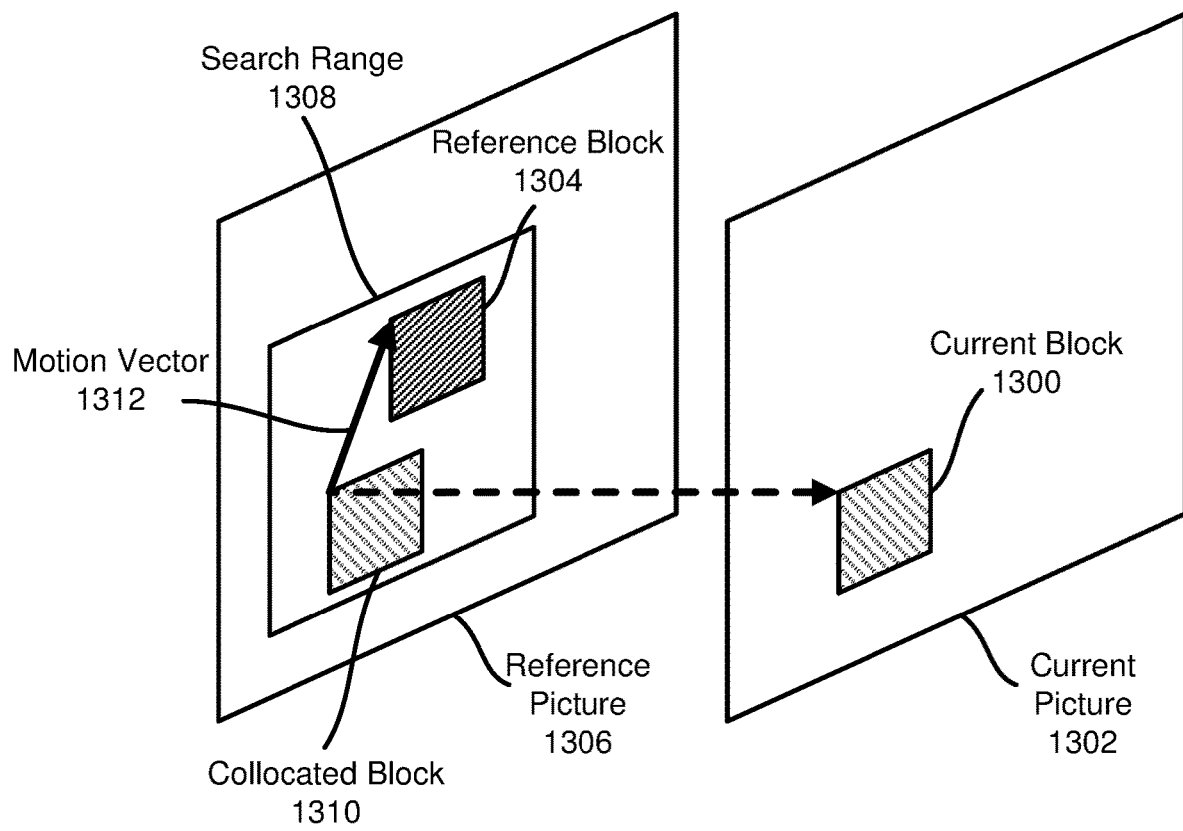
FIG. 13A illustrates an example of inter prediction performed for a current block in a current picture being encoded in accordance with embodiments of the present disclosure.

FIG. 13A illustrates an example of inter prediction performed for a current block 1300 in a current picture 1302 being encoded. An encoder, such as encoder 200 in FIG. 2, may perform inter prediction to determine and/or generate a reference block 1304 in a reference picture 1306 to predict current block 1300. Reference pictures, like reference picture 1306, are prior decoded pictures available at the encoder and decoder. Availability of a prior decoded picture may depend on whether the prior decoded picture is available in a decoded picture buffer at the time current block 1300 is being encoded or decoded. The encoder may, for example, search one or more reference pictures for a reference block that is similar to current block 1300. The encoder may determine a "best matching" reference block from the blocks tested during the searching process as reference block 1304. The encoder may determine that reference block 1304 is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), or sum of absolute transformed differences (SATD)) between the prediction samples of reference block 1304 and the original samples of current block 1300.

The encoder may search for reference block 1304 within a search range 1308. Search range 1308 may be positioned around the collocated position (or block) 1310 of current block 1300 in reference picture 1306. In some instances, search range 1308 may at least partially extend outside of reference picture 1306. When extending outside of reference picture 1306, constant boundary extension may be used such that the values of the samples in the row or column of reference picture 1306, immediately adjacent to the portion of search range 1308 extending outside of reference picture 1306, are used for the "sample" locations outside of reference picture 1306. All or a subset of potential positions within search range 1308 may be searched for reference block 1304. The encoder may utilize any one of a number of different search implementations to determine and/or generate reference block 1304. For example, the encoder may determine a set of a candidate search positions based on motion information of neighboring blocks to current block 1300.

One or more reference pictures may be searched by the encoder during inter prediction to determine and/or generate the best matching reference block. The reference pictures searched by the encoder may be included in one or more reference picture lists. For example, in HEVC and VVC, two reference picture lists may be used, a reference picture list 0 and a reference picture list 1. A reference picture list may include one or more pictures. Reference picture 1306 of reference block 1304 may be indicated by a reference index pointing into a reference picture list comprising reference picture 1306.

Figure 13B:
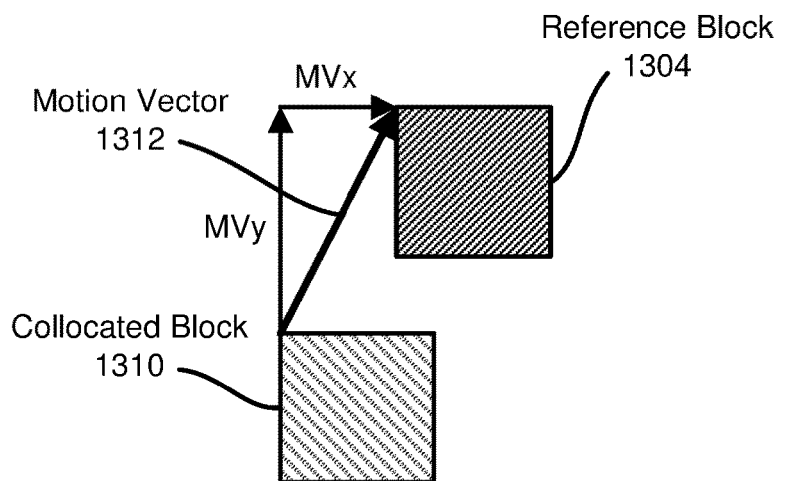
FIG. 13B illustrates an example horizontal component and vertical component of a motion vector in accordance with embodiments of the present disclosure.

The displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component ($MV_x$) and a vertical component ($MV_y$) relative to the position of current block 1300. FIG. 13B illustrates the horizontal component and vertical component of motion vector 1312. A motion vector, such as motion vector 1312, may have fractional or integer resolution. A motion vector with fractional resolution may point between two samples in a reference picture to provide a better estimation of the motion of current block 1300. For example, a motion vector may have ½, ¼, ⅛, 1/16, or 1/32 fractional sample resolution. When a motion vector points to a non-integer sample value in the reference picture, interpolation between samples at integer positions may be used to generate the reference block and its corresponding samples at fractional positions. The interpolation may be performed by a filter with two or more taps.

Once reference block 1304 is determined and/or generated for current block 1300 using inter prediction, the encoder may determine a difference (e.g., a corresponding sample-by-sample difference) between reference block 1304 and current block 1300. The difference may be referred to as a prediction error or residual. The encoder may then store and/or signal in a bitstream the prediction error and the related motion information for decoding or other forms of consumption. The motion information may include motion vector 1312 and a reference index pointing into a reference picture list comprising reference picture 1306. In other instances, the motion information may include an indication of motion vector 1312 and an indication of the reference index pointing into the reference picture list comprising reference picture 1306. A decoder may decode current block 1300 by determining and/or generating reference block 1304, which forms the prediction of current block 1300, using the motion information and combining the prediction with the prediction error.

Figure 14:
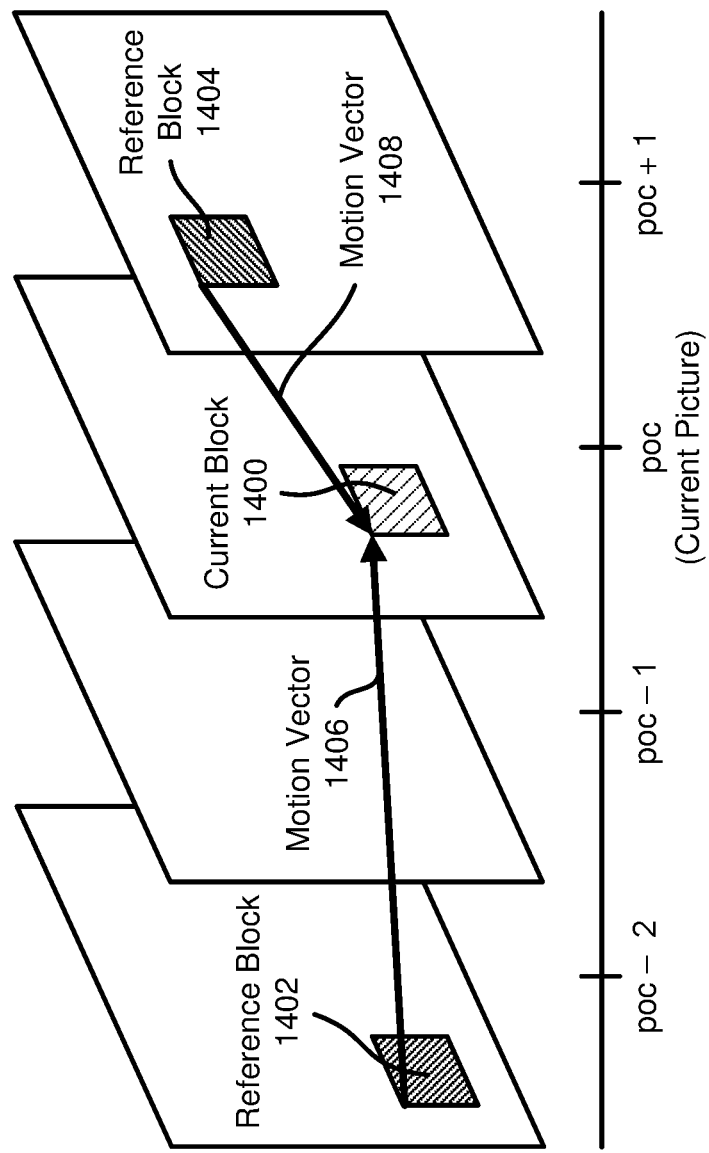
FIG. 14 illustrates an example of bi-prediction, performed for a current block in accordance with embodiments of the present disclosure.

In FIG. 13A, inter prediction is performed using one reference picture 1306 as the source of the prediction for current block 1300. Because the prediction for current block 1300 comes from a single picture, this type of inter prediction is referred to as uni-prediction. FIG. 14 illustrates another type of inter prediction, referred to as bi-prediction, performed for a current block 1400. In bi-prediction, the source of the prediction for a current block 1400 comes from two pictures. Bi-prediction may be useful, for example, where the video sequence comprises fast motion, camera panning or zooming, or scene changes. Bi-prediction may also be useful to capture fade outs of one scene or fade outs from one scene to another, where two pictures are effectively displayed simultaneously with different levels of intensity.

Whether uni-prediction or both uni-prediction and bi-prediction are available for performing inter prediction may depend on a slice type of current block 1400. For P slices, only uni-prediction may be available for performing inter prediction. For B slices, either uni-prediction or bi-prediction may be used. When uni-prediction is performed, an encoder may determine and/or generate a reference block for predicting current block 1400 from reference picture list 0. When bi-prediction is performed, an encoder may determine and/or generate a first reference block for predicting current block 1400 from reference picture list 0 and determine and/or generate a second reference block for predicting current block 1400 from reference picture list 1.

In FIG. 14, inter-prediction is performed using bi-prediction, where two reference blocks 1402 and 1404 are used to predict current block 1400. Reference block 1402 may be in a reference picture of one of reference picture list 0 or 1, and reference block 1404 may be in a reference picture of the other one of reference picture list 0 or 1. As shown in FIG. 14, reference block 1402 is in a picture that precedes the current picture of current block 1400 in terms of picture order count (POC), and reference block 1402 is in a picture that proceeds the current picture of current block 1400 in terms of POC. In other examples, the reference pictures may both precede or proceed the current picture in terms of POC. POC is the order in which pictures are output from, for example, a decoded picture buffer and is the order in which pictures are generally intended to be displayed. However, it should be noted that pictures that are output are not necessarily displayed but may undergo different processing or consumption, such as transcoding. In other examples, the two reference blocks determined and/or generated using bi-prediction may come from the same reference picture. In such an instance, the reference picture may be included in both reference picture list 0 and reference picture list 1.

A configurable weight and offset value may be applied to the one or more inter prediction reference blocks. An encoder may enable the use of weighted prediction using a flag in a picture parameter set (PPS) and signal the weighting and offset parameters in the slice segment header for the current block. Different weight and offset parameters may be signaled for luma and chroma components.

Once reference blocks 1402 and 1404 are determined and/or generated for current block 1400 using inter prediction, the encoder may determine a difference between current block 1400 and each of reference blocks 1402 and 1404. The differences may be referred to as prediction errors or residuals. The encoder may then store and/or signal in a bitstream the prediction errors and their respective related motion information for decoding or other forms of consumption. The motion information for reference block 1402 may include motion vector 1406 and the reference index pointing into the reference picture list comprising the reference picture of reference block 1402. In other instances, the motion information for reference block 1402 may include an indication of motion vector 1406 and an indication of the reference index pointing into the reference picture list comprising reference picture 1402. The motion information for reference block 1404 may include motion vector 1408 and the reference index pointing into the reference picture list comprising the reference picture of reference block 1404. In other instances, the motion information for reference block 1404 may include an indication of motion vector 1408 and an indication of the reference index pointing into the reference picture list comprising reference picture 1404. A decoder may decode current block 1400 by determining and/or generating reference blocks 1402 and 1404, which together form the prediction of current block 1400, using their respective motion information and combining the predictions with the prediction errors.

In HEVC, VVC, and other video compression schemes, motion information may be predictively coded before being stored or signaled in a bit stream. The motion information for a current block may be predictively coded based on the motion information of neighboring blocks of the current block. In general, the motion information of the neighboring blocks is often correlated with the motion information of the current block because the motion of an object represented in the current block is often the same or similar to the motion of objects in the neighboring blocks. Two of the motion information prediction techniques in HEVC and VVC include advanced motion vector prediction (AMVP) and inter prediction block merging.

An encoder, such as encoder 200 in FIG. 2, may code a motion vector using the AMVP tool as a difference between the motion vector of a current block being coded and a motion vector predictor (MVP). An encoder may select the MVP from a list of candidate MVPs. The candidate MVPs may come from previously decoded motion vectors of neighboring blocks in the current picture of the current block or blocks at or near the collocated position of the current block in other reference pictures. Both the encoder and decoder may generate or determine the list of candidate MVPs.

After the encoder selects an MVP from the list of candidate MVPs, the encoder may signal, in a bitstream, an indication of the selected MVP and a motion vector difference (MVD). The encoder may indicate the selected MVP in the bitstream by an index pointing into the list of candidate MVPs. The MVD may be calculated based on the difference between the motion vector of the current block and the selected MVP. For example, for a motion vector represented by a horizontal component ($MV_x$) and a vertical displacement ($MV_y$) relative to the position of the current block being coded, the MVD may be represented by two components calculated as follows:

$$MVD_x = MV_x - MVP_x \qquad (10)$$

$$MVD_y = MV_y - MVP_y \qquad (11)$$

where $MVD_x$ and $MVD_y$ respectively represent the horizontal and vertical components of the MVD, and $MVP_x$ and $MVP_y$ respectively represent the horizontal and vertical components of the MVP. A decoder, such as decoder 300 in FIG. 3, may decode the motion vector by adding the MVD to the MVP indicated in the bitstream. The decoder may then decode the current block by determining and/or generating the reference block, which forms the prediction of the current block, using the decoded motion vector and combining the prediction with the prediction error.

Figure 15A:
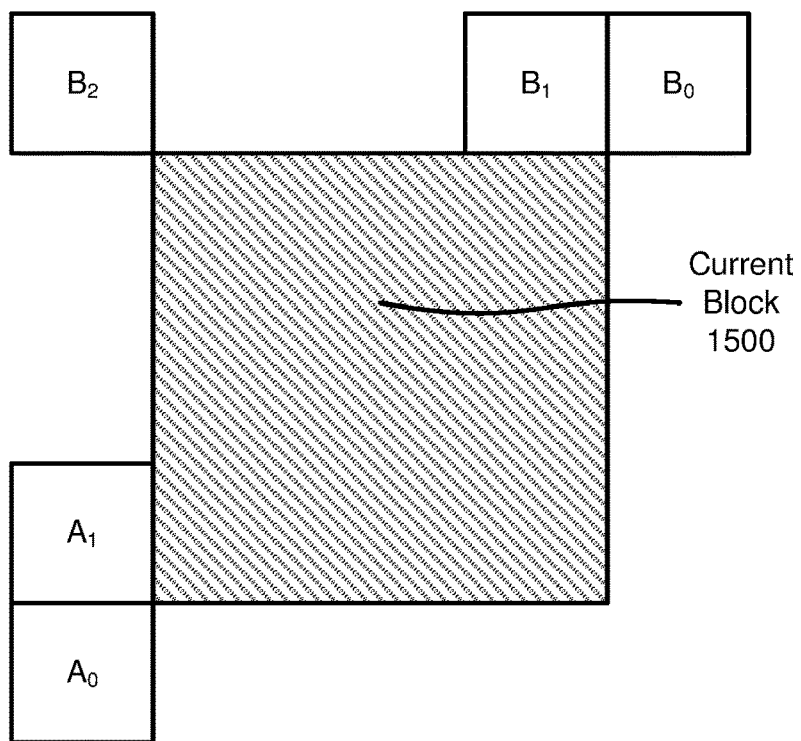
FIG. 15A illustrates an example location of five spatial candidate neighboring blocks relative to a current block being coded in accordance with embodiments of the present disclosure.
Figure 15B:
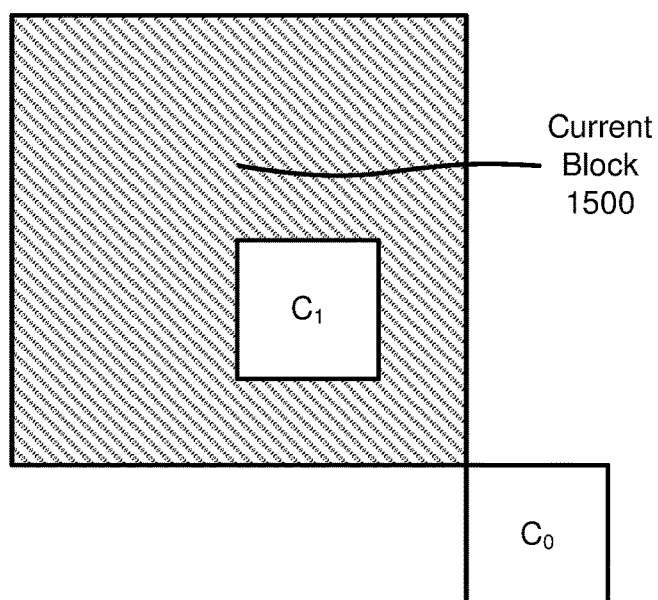
FIG. 15B illustrates an example location of two temporal, co-located blocks relative to a current block being coded in accordance with embodiments of the present disclosure.

In HEVC and VVC, the list of candidate MVPs for AMVP may comprise two candidates referred to as candidates A and B. Candidates A and B may include up to two spatial candidate MVPs derived from five spatial neighboring blocks of the current block being coded, one temporal candidate MVP derived from two temporal, co-located blocks when both spatial candidate MVPs are not available or are identical, or zero motion vectors when the spatial, temporal, or both candidates are not available. FIG. 15A illustrates the location of the five spatial candidate neighboring blocks relative to a current block 1500 being encoded. The five spatial candidate neighboring blocks are respectively denoted $A_0$, $A_1$, $B_0$, $B_1$, and $B_2$. FIG. 15B illustrates the location of the two temporal, co-located blocks relative to current block 1500 being coded. The two temporal, co-located blocks are denoted $C_0$ and $C_1$ and are included in a reference picture that is different from the current picture of current block 1500.

An encoder, such as encoder 200 in FIG. 2, may code a motion vector using the inter prediction block merging tool also referred to as merge mode. Using merge mode, the encoder may reuse the same motion information of a neighboring block for inter prediction of a current block. Because the same motion information of a neighboring block is used, no MVD needs to be signaled and the signaling overhead for signaling the motion information of the current block may be small in size. Similar to AMVP, both the encoder and decoder may generate a candidate list of motion information from neighboring blocks of the current block. The encoder may then determine to use (or inherit) the motion information of one neighboring block's motion information in the candidate list for predicting the motion information of the current block being coded. The encoder may signal, in the bit stream, an indication of the determined motion information from the candidate list. For example, the encoder may signal an index pointing into the list of candidate motion information to indicate the determined motion information.

In HEVC and VVC, the list of candidate motion information for merge mode may comprise up to four spatial merge candidates that are derived from the five spatial neighboring blocks used in AMVP as shown in FIG. 15A, one temporal merge candidate derived from two temporal, co-located blocks used in AMVP as shown in FIG. 15B, and additional merge candidates including bi-predictive candidates and zero motion vector candidates.

It should be noted that inter prediction may be performed in other ways and variants than those described above. For example, motion information prediction techniques other than AMVP and merge mode are possible. In addition, although the description above was primarily made with respect to inter prediction modes in HEVC and VVC, it will be understood that the techniques of the present disclosure described above and further below may be applied to other inter prediction modes, including those of other video coding standards like VP8, VP9, AV1, and the like. In addition, history based motion vector prediction (HMVP), combined intra/inter prediction mode (CIIP), and merge mode with motion vector difference (MMVD) as described in VVC may also be performed and are within the scope of the present disclosure.

In inter prediction, a block matching technique may be applied to determine a reference block in a different picture than the current block being encoded. Block matching techniques have also been applied to determine a reference block in the same picture as a current block being encoded. However, it has been determined that for camera-captured videos, a reference block in the same picture as the current block determined using block matching may often not accurately predict the current block. For screen content video this is generally not the case. Screen content video may include, for example, computer generated text, graphics, and animation. Within screen content, there is often repeated patterns (e.g., repeated patterns of text and graphics) within the same picture. Therefore, a block matching technique applied to determine a reference block in the same picture as a current block being encoded may provide efficient compression for screen content video.

HEVC and VVC both include a prediction technique to exploit the correlation between blocks of samples within the same picture of screen content video. This technique is referred to as intra block (IBC) or current picture referencing (CPR). Similar to inter prediction, an encoder may apply a block matching technique to determine a displacement vector (referred to as a block vector (BV)) that indicates the relative displacement from the current block to a reference block (or intra block compensated prediction) that "best matches" the current block. The encoder may determine the best matching reference block from blocks tested during a searching process similar to inter prediction. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. A reference block may correspond to prior decoded blocks of samples of the current picture. The reference block may comprise decoded blocks of samples of the current picture prior to being processed by in-loop filtering operations, like deblocking or SAO filtering. FIG. 16 illustrates an example of IBC applied for screen content. The rectangular portions with arrows beginning at their boundaries are current blocks being encoded and the rectangular portions that the arrows point to are the reference blocks for predicting the current blocks.

Once a reference block is determined and/or generated for a current block using IBC, the encoder may determine a difference (e.g., a corresponding sample-by-sample difference) between the reference block and the current block. The difference may be referred to as a prediction error or residual. The encoder may then store and/or signal in a bitstream the prediction error and the related prediction information for decoding or other forms of consumption. The prediction information may include a BV. In other instances, the prediction information may include an indication of the BV. A decoder, such as decoder 300 in FIG. 3, may decode the current block by determining and/or generating the reference block, which forms the prediction of the current block, using the prediction information and combining the prediction with the prediction error.

In HEVC, VVC, and other video compression schemes, a BV may be predictively coded before being stored or signaled in a bit stream. The BV for a current block may be predictively coded based on the BV of neighboring blocks of the current block. For example, an encoder may predictively code a BV using the merge mode as explained above for inter prediction or a similar technique as AMVP also explained above for inter prediction. The technique similar to AMVP may be referred to as BV prediction and difference coding.

For BV prediction and difference coding, an encoder, such as encoder 200 in FIG. 2, may code a BV as a difference between the BV of a current block being coded and a BV predictor (BVP). An encoder may select the BVP from a list of candidate BVPs. The candidate BVPs may come from previously decoded BVs of neighboring blocks of the current block in the current picture. Both the encoder and decoder may generate or determine the list of candidate BVPs.

After the encoder selects a BVP from the list of candidate BVPs, the encoder may signal, in a bitstream, an indication of the selected BVP and a BV difference (BVD). The encoder may indicate the selected BVP in the bitstream by an index pointing into the list of candidate BVPs. The BVD may be calculated based on the difference between the BV of the current block and the selected BVP. For example, for a BV represented by a horizontal component ($BV_x$) and a vertical component ($BV_y$) relative to the position of the current block being coded, the BVD may represented by two components calculated as follows:

$$BVD_x = BV_x - BVP_x \quad (12)$$

$$BVD_y = BV_y - BVP_y \quad (13)$$

where $BVD_x$ and $BVD_y$ respectively represent the horizontal and vertical components of the BVD, and $BVP_x$ and $BVP_y$ respectively represent the horizontal and vertical components of the BVP. A decoder, such as decoder 300 in FIG. 3, may decode the BV by adding the BVD to the BVP indicated in the bitstream. The decoder may then decode the current block by determining and/or generating the reference block, which forms the prediction of the current block, using the decoded BV and combining the prediction with the prediction error.

In HEVC and VVC, the list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC are the same as those shown in FIG. 15A for inter prediction. The five spatial candidate neighboring blocks are respectively denoted $A_0$, $A_1$, $B_0$, $B_1$, and $B_2$.

Video encoding and decoding may be performed on a block-by-block basis. The process of partitioning a picture of a video sequence into blocks may be adaptive based on the content of the picture. For example, a current picture in a video sequence may be partitioned into blocks based on the boundaries of moving objects in the video sequence. Each block may then be predicted using, for example, inter prediction that determines a motion vector (MV) that describes the displacement between the block in the current picture and a reference block in a reference picture. For some sequences (e.g., natural sequences), the boundaries of moving objects may not be rectangular. As a result, the prediction error for block based partitioning may be larger for these sequences. A larger prediction error requires a higher bitrate to signal to a decoder.

Figure 17:
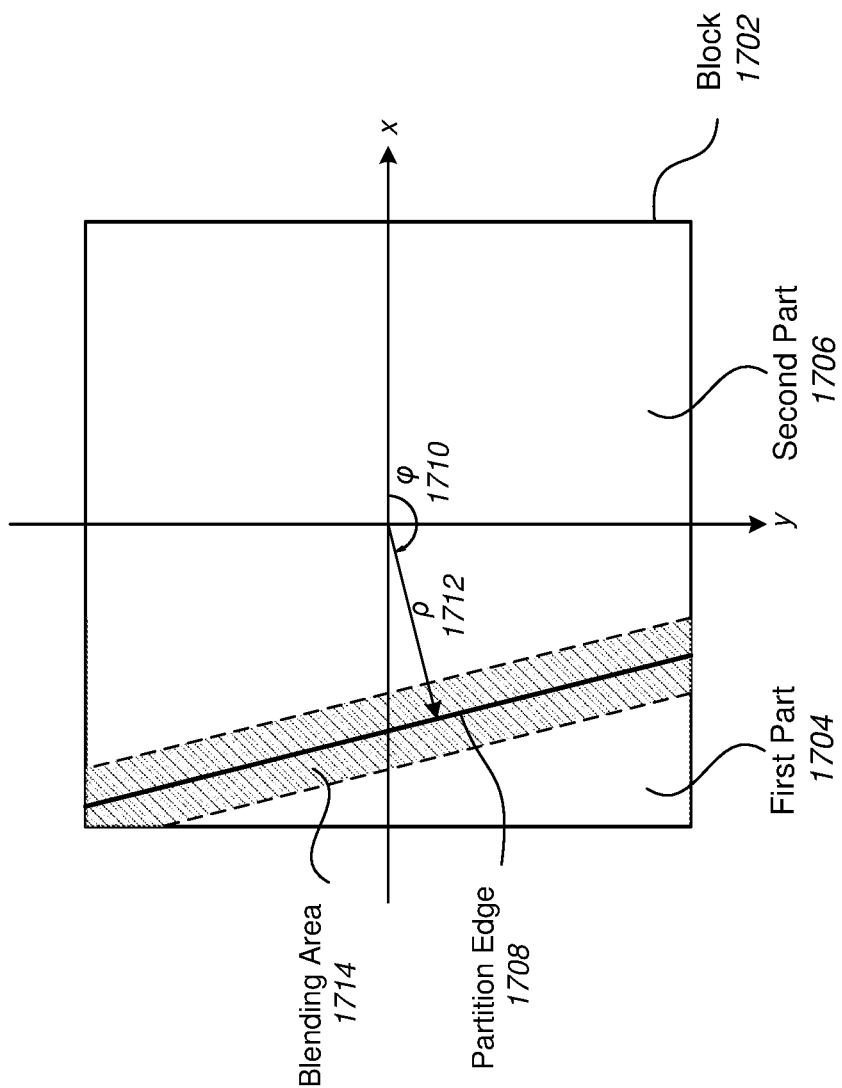
FIG. 17 illustrates an example of geometric partitioning of a rectangular block in accordance with embodiments of the present disclosure.

Geometric partitioning may further split a rectangular block into two parts by a partition edge to improve partition accuracy. FIG. 17 illustrates an example of geometric partitioning of a rectangular block 1702. Block 1702 is partitioned into a first part 1704 and a second part 1706 based on a partition edge 1708. The location of partition edge 1708 may be specified by an angle variable and an offset variable. For example, the equation of partition edge 1708 may be expressed as follows:

$$x \cos \varphi + y \sin \varphi - \rho = 0 \quad (14)$$

where (x, y) denotes a position in the coordinate system with the center of block 1702 as the origin. In the example illustrated in FIG. 17, the angle variable $\varphi$ 1710 describes the clockwise angle from the x-axis to the normal vector of partition edge 1708, and the offset variable p 1712 indicates the distance of partition edge 1708 from the origin.

Each of first part 1704 and second part 1706 may be predicted using, for example, either intra prediction or inter prediction to generate a prediction for each of the two parts. After predicting each of first part 1704 and second part 1706, the predictions of the two parts may be merged into a block prediction using a weighted sum. Each pixel of the block prediction is calculated by the sum of a pixel value of the prediction in first part 1704 multiplied by a first weighting value and a pixel value of the prediction in second part 1706 multiplied by a second weighting value. Both weighting values are greater than or equal to zero and their sum is equal to one. In one example of hard blending, the first weighting value is one when a position of the pixel value is inside first part 1704; otherwise, it is zero. The second weighting value is determined by subtracting the first weighting value from one. In another example of soft blending, the two predictions are merged into a block prediction using a blending around partition edge 1708. In the example illustrated in FIG. 17, the weighting values for a pixel may be determined using a ratio of a distance between the pixel and one of the two dashed lines shown in FIG. 17 to a distance between the pixel and partition edge 1708 when the pixel is inside blending area 1714 between the two dashed lines; otherwise, the weighting values are either zero or one based on the part of the geometric partition they belong to. A transform and quantization process may be applied to the block prediction.

The angle variable $\varphi$, the offset variable $\rho$, or both may be quantized. For example, the angle variable $\varphi$, the offset variable $\rho$, or both may be quantized according to a finite set of geometric partitions or what may be alternatively referred to as geometric partition modes. An index indicating a geometric partition mode used to quantize the angle variable $\varphi$ and offset variable $\rho$ may be signaled in a bitstream. In VVC, 64 different geometric partition modes are available. Each partition mode in VVC indicates a combination of a slope ($\tan(\varphi)$) and an offset variable $\rho$. The slope of a partition mode in VVC is limited to a value in the set $\{0, \pm\frac{1}{4}, \pm\frac{1}{2}, \pm1, \pm2, \infty\}$. The offset variable $\rho$ for a partition mode in VVC is determined based on the size of the block being partitioned and the angle variable $\varphi$ of the partition mode according to the equation $$\pm \frac{j}{8}l, j \in \{0, 1, 2, 3\},$$

where $$l = \begin{cases} w\cos(\varphi) & \text{if } w > h, \\ h\sin(\varphi) & \text{otherwise.} \end{cases} \quad (15)$$

The parameters w and h respectively represent the width and the height of the block being partitioned.

In existing technologies, the number of geometric partitioning modes available to partition a block is finite. As a result, a partition edge corresponding to a selected one of the finite number of geometric partition modes may not accurately partition a block to reduce a prediction residual of the block. For example, a partition edge corresponding to a selected one of the finite number of geometric partition modes may not accurately partition a block along the border of an object in the block. Regions along the border of the object may have significant prediction errors because the motion field is often segmented by the boundaries of objects in a picture that move relative to each other. For larger size blocks, this problem may be further exacerbated because the number of finite geometric partition modes may not scale with block size, resulting in a larger quantization error between an ideal partition edge for the block and the closest matching partition edge in the finite set of available partition modes. A simple approach to increasing partition accuracy is to increase the number of partition modes available. However, such an approach will also increase overhead required to signal a selected partition mode in a bitstream to a decoder or other device receiving the bitstream.

Embodiments of the present disclosure are related to an approach for refining an initial partition edge, selected from a finite set of available partition modes, for partitioning a rectangular block into two parts. The refined partition edge may more accurately match an ideal or desired partition edge for a block (e.g., by more accurately matching the border of an object in the block) than the initial partition edge. In example embodiments, an encoder may determine reference samples from neighboring blocks of the rectangular block and refine the initial partition edge based on the reference samples and one or more edge detection methods. The encoder may signal partition information based on either the initial partition edge or refined partition edge, and information for the one or more edge detection methods. The decoder may decode the refined partition edge based on the partition information and edge detection methods. These and other features of the present disclosure are described further below.

Figure 18:
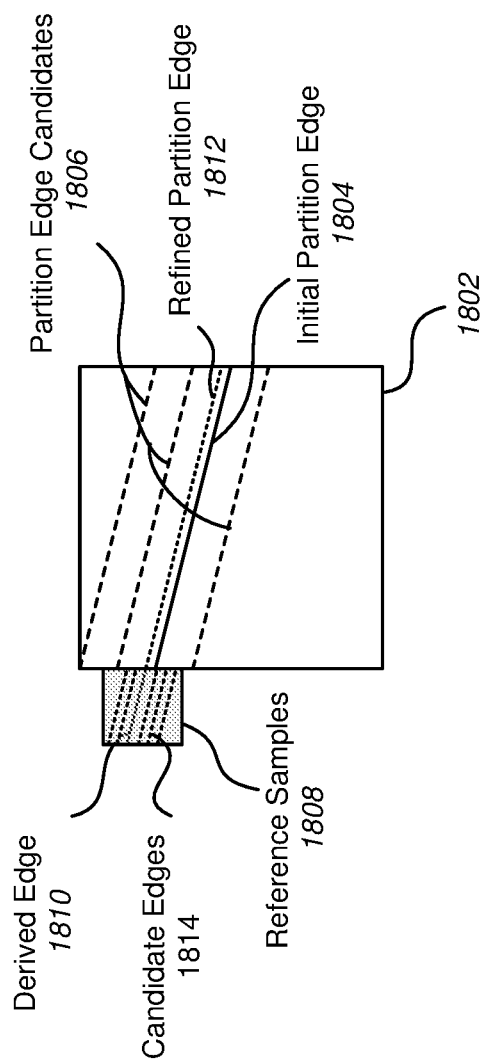
FIG. 18 illustrates an example refinement of a partition edge in accordance with embodiments of the present disclosure.

FIG. 18 illustrates an example refinement of a partition edge selected for a current block 1802 in accordance with embodiments of the present disclosure. Block 1802 may be a CU in a picture of a video sequence that is currently undergoing encoding. An encoder, such as encoder 200 in FIG. 2, may select an initial partition edge 1804 for block 1802 from a finite set of geometric partitioning modes. The finite set of geometric partitioning modes may comprise one or more of geometric partitioning modes (e.g., the 64 geometric partition modes available in VVC), multi-type tree splitting modes, and quadtree splitting modes. In an example, the finite set of geometric partitioning modes include partition edge candidates 1806 shown with the same angle variable as that of initial partition edge 1804 in FIG. 18 and/or other partition edge candidates not shown in FIG. 18.

For each of the finite set of geometric partitioning modes, the encoder may predict a first part and a second part of block 1802 determined by the segmentation of block 1802 by the geometric partition mode. For example, the encoder may predict the first part and the second part of block 1802 using, for example, either intra prediction or inter prediction to generate a prediction for each of the two parts. The predictions of the two parts may be merged into a block prediction using a weighted sum. A prediction error may be determined based on the difference between the block prediction and original sample values of block 1802. The encoder may select initial partitioning edge 1804 to encode block 1802 based on the prediction error. For example, the encoder may select initial partition edge 1804 that results in the smallest prediction error for block 1802. In another example, the encoder may select initial partition edge 1804 based on rate-distortion measure determined using the prediction error.

In the case where the number of geometric partitioning modes is finite, initial partition edge 1804 may not accurately partition block 1802 along an ideal partition edge for block 1802. For example, initial partition edge 1804 may not go closely align with the border of an object in the block. This deviation may be worse for larger size blocks. For example, in VVC, the offset variable may have a value in {0, ±8, ±16, ±24} for a block size of 64×64. When the position and orientation errors between an initial partition edge and an ideal partition edge are large, regions along the border of the object may have large prediction errors.

The encoder may determine reference samples 1808 from neighboring blocks to refine initial partition edge 1804 to better match a desired partition edge. Neighboring blocks may include the prior encoded and reconstructed samples of the picture in which block 1802 resides. For example, neighboring blocks may include prior encoded and reconstructed samples from blocks immediately adjacent to the left or above block 1802 in the picture. Reference samples 1808 may have multiple rows and multiple columns. Reference samples 1808 may be determined based on initial partition edge 1804. For example, reference samples 1808 may be determined based on a distance of each sample in reference samples 1808 from initial partition edge 1804. The distance of each sample in reference samples 1808 from initial partition edge may be smaller than or equal to a threshold. For example, the threshold may be determined as half of the minimum differences of the offset variables of two different partition edge candidates 1806.

In some examples, one or more edge detection methods may be applied in reference samples 1808 to generate a derived edge 1810. For example, edge detection methods may compute a measure of edge strength and search for local directional maxima of the measure. The measure of edge strength may be computed by a first-order derivative expression such as the gradient magnitude. Reference samples 1808 are referred to as r, where r(x, y) denotes the reference sample of reference samples 1808 at the coordinates (x, y). The gradient magnitude may be computed as follows:

$$\|\nabla r(x, y)\| = \sqrt{\left(\frac{\partial r}{\partial x}\right)^2 + \left(\frac{\partial r}{\partial y}\right)^2}, \quad (16)$$

where

-continued $$\frac{\partial r}{\partial x}$$

and $$\frac{\partial r}{\partial y}$$

are the partial derivatives with respect to x and y, respectively. The derivatives may be approximated by finite differences as $$\frac{\partial r}{\partial x} = r(x+1, y) - r(x, y)$$

and $$\frac{\partial r}{\partial y} = r(x, y+1) - r(x, y).$$

The local directional maxima may be computed based on the estimation of the local orientation of the edge, such as the gradient direction. The gradient direction can be calculated by the formula:

$$\arctan \frac{\frac{\partial r}{\partial y}}{\frac{\partial r}{\partial x}}. \quad (17)$$

In another example, the measure of edge strength may be determined by the magnitude of the directional derivative in the direction (cos φ, sin φ) based on angle variable φ such as:

$$\|D_\varphi r(x, y)\| = \left\|\frac{\partial r}{\partial x}\cos\varphi + \frac{\partial r}{\partial y}\sin\varphi\right\|. \quad (18)$$

The edge detection methods may search for the maxima of the magnitude of the directional derivative. In another example of edge detection methods may search for zero crossings in a second-derivative expression, such as the Laplacian $$\Delta r = \nabla^2 r = \left(\frac{\partial r}{\partial x}\right)^2 + \left(\frac{\partial r}{\partial y}\right)^2.$$

Derived edge 1810 may be used to generate refined partition edge 1812. In some examples, derived edge 1810 may be selected from a plurality of candidate edges 1814 determined based on reference samples 1808. Edge detection methods may generate an edge map from the reference samples 1808 based on the measure of edge strength. For example, the edge map may be determined by comparing the measure of edge strength with a threshold, to decide whether edges are present or not at a coordinate in reference samples 1808. Candidate edges 1814 may be determined based on the edge map. For example, candidate edges 1814 may be selected by approximating straight lines from the edge map. Edge detection methods may further apply edge thinning algorithms to generate the edge map. Edge thinning algorithms may convert binary shapes in edge maps to one-pixel wide edges without shortening edges or breaking edges apart. Edge detection methods may compute the sum of the measure of edge strength over each of the candidate edges 1814. Edge detection methods may determine derived edge 1810 by comparing each sum of the measure of edge strength with other sums of the candidate edges 1814. Refined partition edge 1812 may be determined based on derived edge 1810 selected from candidate edges 1814. For example, derived edge 1810 may extend the line in block 1802 to generate refined partition edge 1812.

The encoder may determine two parts of block 1802 based on the refined partitioning edge. The encoder may generate a prediction for each of the two parts based on respective prediction modes. In an example, the two prediction modes may be intra prediction modes. The two intra prediction modes may be the same or different. For example, the two intra prediction modes may be selected from the 64 intra prediction modes available in VVC. In some examples, the prediction mode of one of the parts may be an intra prediction mode and the prediction mode of the other part may be an inter prediction mode. In other examples, the two prediction modes may both be inter prediction modes.

The encoder may merge the two predictions into a prediction of block 1802. Each sample of the prediction of block 1802 may be determined based on a weighted sum of the two predictions for the two parts. The weighted sum is calculated by the sum of a pixel value of the prediction in a first part multiplied by a first weighting value and a pixel value of the prediction in a second part multiplied by a second weighting value. The two weighting values are greater than or equal to zero and the sum of the two weighting values is equal to one. For example, the first weighting value is one when a position of the pixel value is inside the first part; otherwise, the first weight value is zero. The second weighting value is determined by subtracting the first weighting value from one. In another example illustrated in FIG. 17, the two predictions are merged into the prediction of block 1802 using a soft blending inside a blending area based on refined partition edge 1812. The weighting values may be determined as zero in one border of the blending area and as one in the other border of the blending area. The weight values may be determined as a ratio of a distance of the pixel position from one border of the blending area to a distance of the pixel position from refined partition edge 1812 when the pixel is inside blending area.

Figure 19:
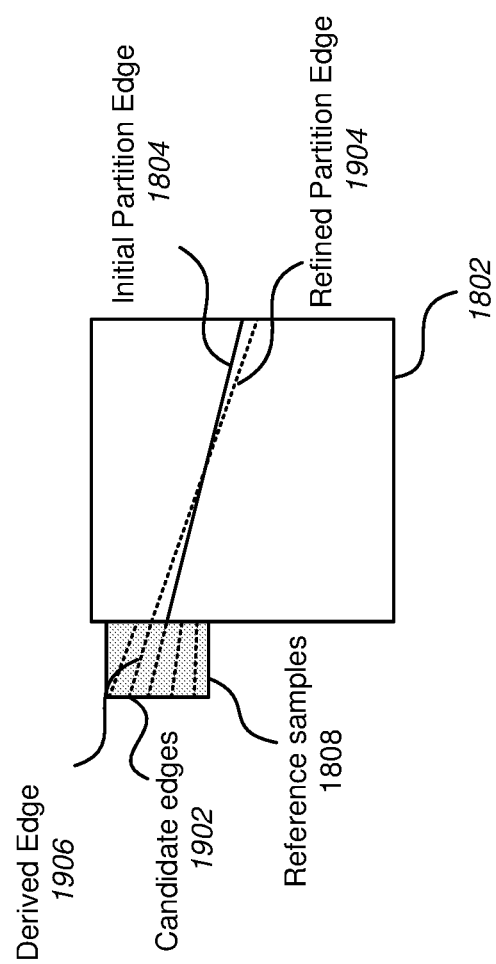
FIG. 19 illustrates an example refinement of a partition edge in accordance with embodiments of the present disclosure.

In FIG. 18, candidate edges 1814 may have the same angle variable as that of initial partition edge 1804. The difference between offset variables of candidate edge 1814 and the offset variable of refined partition edge 1812 may be smaller than or equal to a threshold. For example, the threshold may be determined as the half of the minimum differences of the offset variables of two different partition edge candidates 1806. In another example shown in FIG. 19, candidate edges 1902 may have different angle variables as that of initial partition edge 1804. The difference between offset variables of candidate edge 1902 and the offset variable of refined partition edge 1812 may be smaller than or equal to a threshold. Refined partition edge 1904 may be determined based on derived edge 1906 selected from candidate edges 1902. For example, derived edge 1906 may extend the line in block 1802 to generate refined partition edge 1904.

The encoder may determine a residual for block 1802 based on a difference between block 1802 and the merged prediction of block 1802. The encoder may signal the coded residual of block 1802 and the prediction mode(s) of block 1802 in a bitstream based on, for example, a syntax structure.

In HEVC, VVC, and other video coding implementations, an encoder signals information of a coded video sequence in a bitstream based on syntax structures, and a decoder extracts the information of a coded video sequence from a bitstream based on syntax structures. A syntax structure represents a logical entity of the information coded in the bitstream. These logical entities may include, for example, parameter sets, slices, and coding tree units. Within HEVC and VCC, the syntax structures are specified by syntax tables that indicate variations of the syntax structures. Syntax structures may comprise syntax elements. Syntax elements may occur as flags, values, one-dimensional arrays, or multi-dimensional arrays. For arrays, one or more indices may be used to reference a specific element within the array. The occurrence of a syntax element within a syntax structure may be conditional. For example, the occurrence of a syntax element may be conditional on the value of one or more other syntax elements or values determined during the decoding process.

Partition information may indicate a selected initial partition edge. For example, for FIG. 18, the partition information may indicate initial partition edge 1804. In some examples, the partition information may indicate an index of the initial partition edge among a plurality of geometric partitioning modes. The partition information may be included in a syntax structure as a syntax element. For example, an encoder may use merge_gpm_partition_idx in VVC to signal the partition information.

An indication of refinement of initial partition edge may be included in the syntax as a syntax element. In some examples, the syntax element may be a one-bit flag that indicates whether refinement of the initial partition edge is enabled or not. The flag may be included in a parameter set, such as sequence parameter set. In other examples, the flag may be present if sps_gpm_enabled_flag in VVC is equal to 1 or some other determined value.

Determination of reference samples may be included in the syntax as a syntax element. For example, the number of rows and the number of columns of reference samples may be specified as the syntax element. In other examples, the number of rows and the number of columns of reference samples may be determined based on the size of the block and the minimum differences of the offset variables of two different partition edge candidates.

Edge detection methods may be included in a syntax structure. For example, the syntax element may indicate the measure of edge strength. The threshold and/or methods of determining the threshold may be included in the syntax structure.

Figure 20:
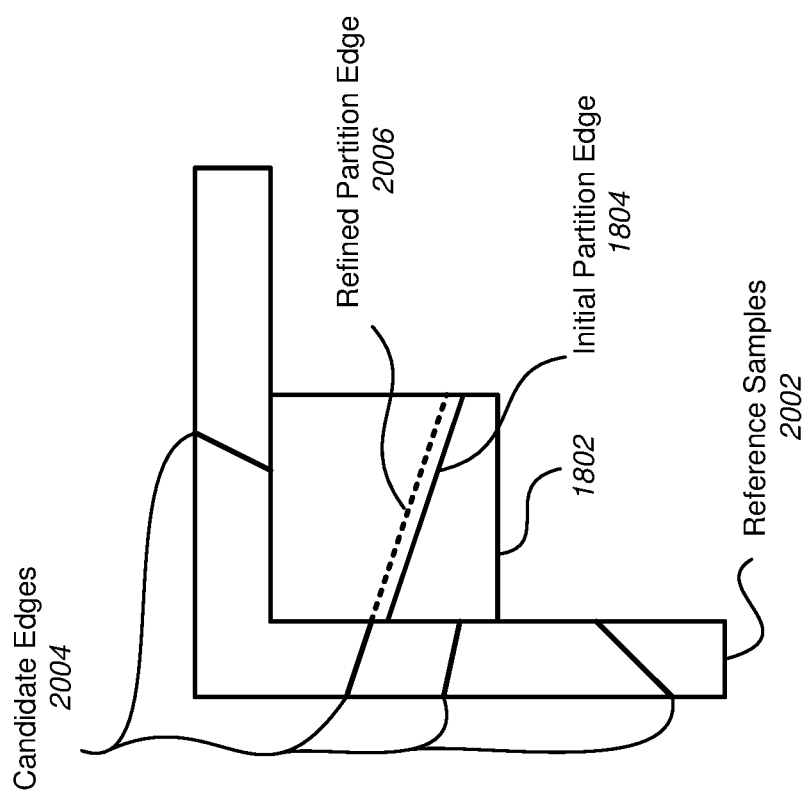
FIG. 20 illustrates an example refinement of a partition edge in accordance with embodiments of the present disclosure.

FIG. 20 illustrates an example refinement of a partition edge selected for a current block 1802 in accordance with embodiments of the present disclosure. The encoder may replace initial partition information with refined partition information. Edge detection methods generate a plurality of candidate edges from reference samples. The refined partition information may include the index selected from the plurality of candidate edges.

In some examples, for block 1802, the encoder may determine reference samples 2002 from neighboring blocks to refine initial partition edge 1804. Neighboring blocks may include the prior encoded and reconstructed samples from immediately adjacent left blocks and/or immediately adjacent above blocks. Reference samples 2002 may have multiple rows and multiple columns. One or more edge detection methods may be applied in the reference samples 2002 to generate a plurality of candidate edges 2004. Encoder may select a derived edge from the plurality of candidate edges 2004 based on initial partition edge 1804. Refined partition edge 2006 may be determined based on the derived edge selected from the plurality of candidate edges 2004. A partition information may indicate the selected refined partition edge. In some examples, the partition information may indicate the index of the refined partition edge among the plurality of candidate edges 2004. Partition information may be included in the syntax structure as a syntax element. For example, the encoder may replace merge_gpm_partition_idx in VVC with the partition information. The partition information may indicate the index selected from candidate edges 2004 to generate refined partition edge 2006.

Figure 21:
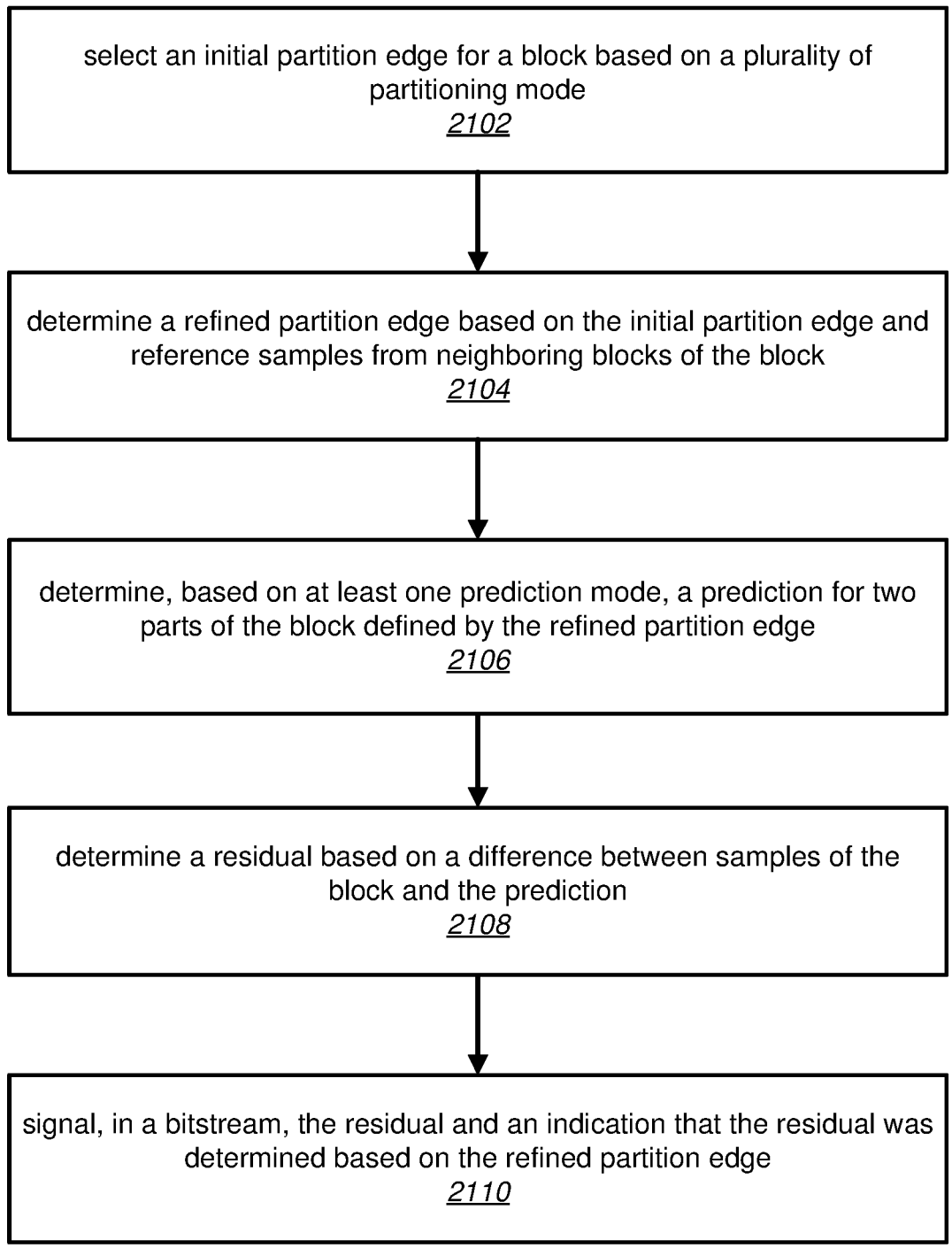
FIG. 21 illustrates a flowchart of a method for geometric partitioning refinement in accordance with embodiments of the present disclosure.

FIG. 21 illustrates a flowchart 2100 of a method for decoder-side geometric partitioning refinement in accordance with embodiments of the present disclosure. The method of flowchart 2100 may be implemented by an encoder, such as encoder 200 in FIG. 2.

The method of flowchart 2100 begins at 2102. At 2102, an initial partition edge for a block (e.g., a block in a picture of a video sequence) may be selected based on a plurality of partitioning modes. The plurality of partitioning modes may comprise one or more of a geometric partitioning mode, a multi-type tree splitting mode, or a quadtree splitting mode.

At 2104, a refined partition edge may be determined based on the initial partition edge and reference samples from neighboring blocks of the block. The reference samples may be determined based on the initial partition edge. In some examples, the determining the refined partition edge may comprise generating a plurality of edges based on the reference samples and selecting an edge from the plurality of edges to refine the initial partition edge. In other examples, the determining the refined partition edge may comprise generating an edge map from the reference samples, determining sets of positions for candidate edges in the reference samples, and refining the initial partition edge based on summing values of the edge map over the positions in each of the sets. The initial partition edge may be determined based on one or more of an angle variable and an offset variable. The candidate edges may comprise one or more of the samples of an edge with an identical angle variable to that of the initial partition edge, or the samples of an edge with an identical offset variable to that of the initial partition edge.

At 2106, a prediction may be determined based on at least one prediction mode for two parts of the block defined by the refined partition edge. At 2108, a residual may be determined based on a difference between samples of the block and the prediction. At 2110, the residual and an indication that the residual was determined based on the refined partition edge may be signaled in a bit stream. In some examples, the indication may comprise a one bit flag. The signaling may further comprise signaling an indication of the initial partition. The indication of the initial partition may be an index representation of one of a plurality of partition modes. In other examples, the indication may comprise an indication of one or more candidate edges determined based on the reference samples. The signaling may further comprise an indication of an edge detection method used to determine an edge in the reference samples. The edge may be used to determine the refined partition edge.

Figure 22:
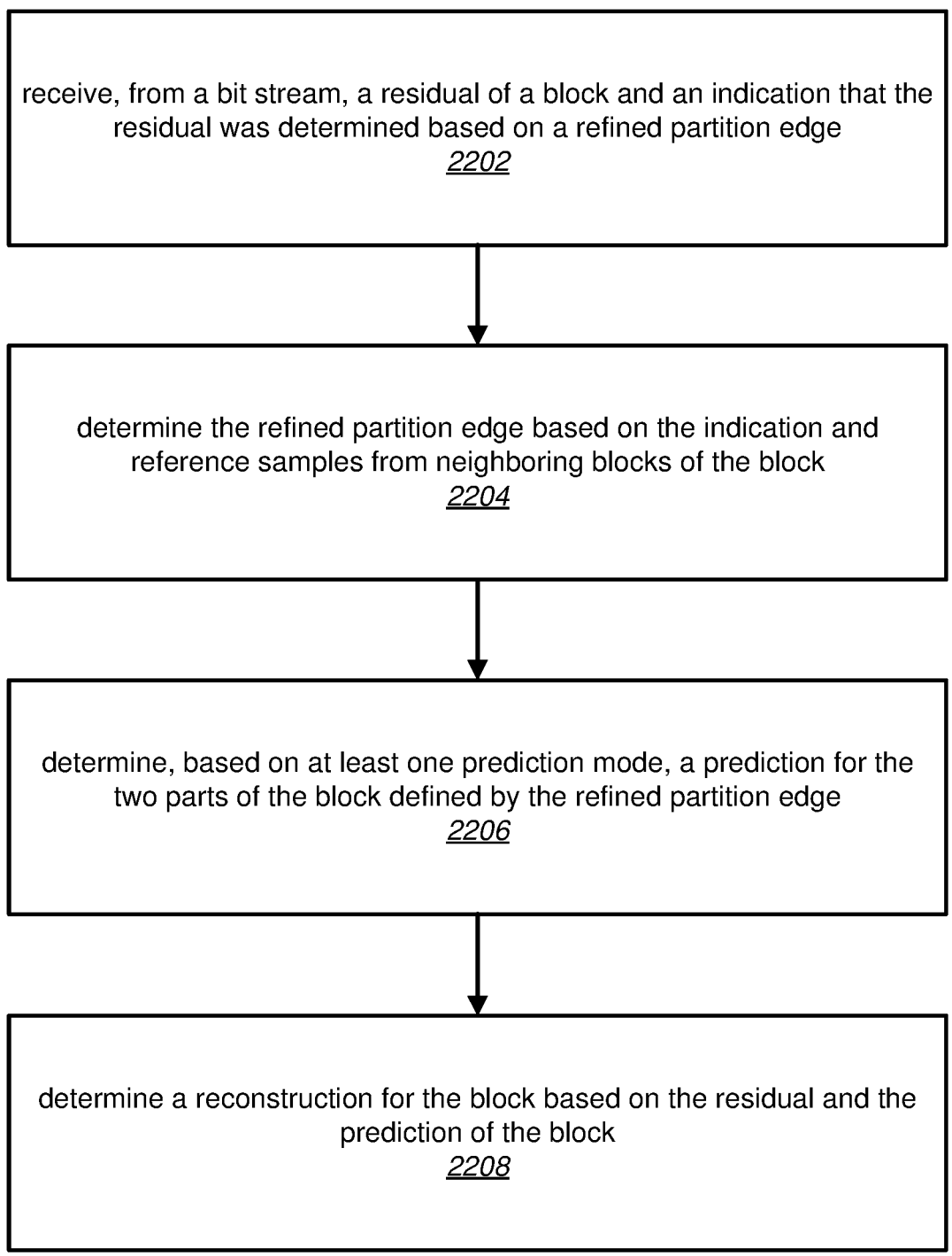
FIG. 22 illustrates a flowchart of a method for geometric partitioning refinement in accordance with embodiments of the present disclosure.

FIG. 22 illustrates a flowchart 2200 of a method for decoder-side geometric partitioning refinement in accordance with embodiments of the present disclosure. The method of flowchart 2200 may be implemented by an decoder, such as decoder 300 in FIG. 3.

The method of flowchart 2200 begins at 2202. At 2202, a residual of a block (e.g., a block in a picture of a video sequence) and an indication that the residual was determined based on a refined partition edge may be received from a bit stream. In some examples, the indication may comprise a one bit flag. The indication may further comprise an indication of the initial partition. The indication of the initial partition may be an index representation of one of a plurality of partitioning modes. In other examples, the indication may comprise an indication of one or more candidate edges determined based on reference samples from neighboring blocks of the block. The indication may further comprise an indication of an edge detection method used to determine an edge in the reference samples. The edge may be used to determine the refined partition edge.

At 2204, the refined partition edge may be determined based on the indication and reference samples from neighboring blocks of the block. The reference samples may be determined based on the initial partition edge. In some examples, the determining the refined partition edge may comprise generating a plurality of edges based on the reference samples and selecting an edge from the plurality of edges to refine the initial partition edge. In other examples, the determining the refined partition edge may comprise generating an edge map from the reference samples, determining sets of positions for candidate edges in the reference samples, and refining the initial partition edge based on summing values of the edge map over the positions in each of the sets.

At 2206, a prediction may be determined based on at least one prediction mode for two parts of the block defined by the refined partition edge. At 2208, a reconstruction for the block may be determined based on the residual and the prediction of the block.

Figure 23:
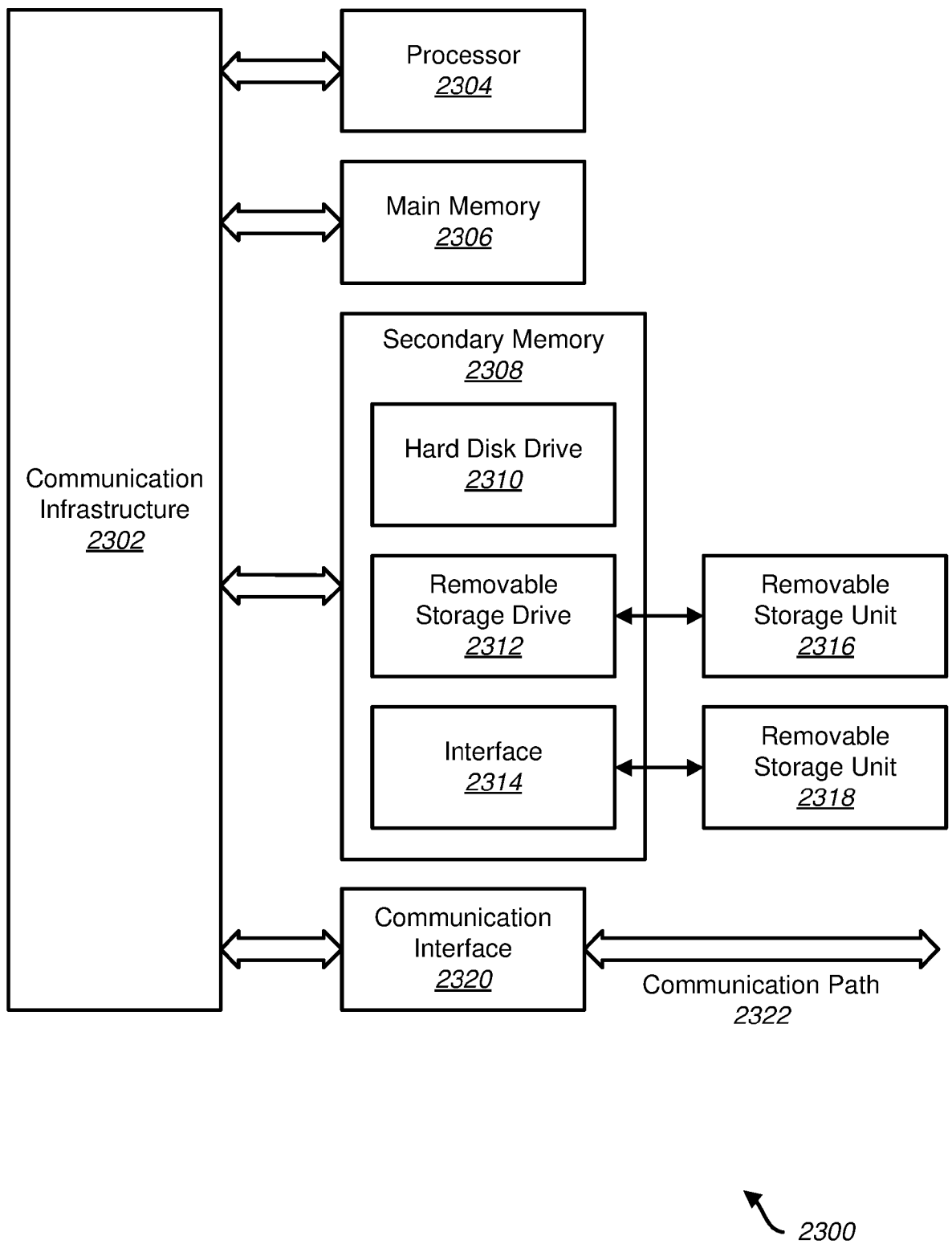
FIG. 23 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2300 is shown in FIG. 23. Blocks depicted in the figures above, such as the blocks in FIGS. 1, 2, and 3, may execute on one or more computer systems 2300. Furthermore, each of the steps of the flowcharts depicted in this disclosure may be implemented on one or more computer systems 2300.

Computer system 2300 includes one or more processors, such as processor 2304. Processor 2304 may be, for example, a special purpose processor, general purpose processor, microprocessor, or digital signal processor. Processor 2304 may be connected to a communication infrastructure 902 (for example, a bus or network). Computer system 2300 may also include a main memory 2306, such as random access memory (RAM), and may also include a secondary memory 2308.

Secondary memory 2308 may include, for example, a hard disk drive 2310 and/or a removable storage drive 2312, representing a magnetic tape drive, an optical disk drive, or the like. Removable storage drive 2312 may read from and/or write to a removable storage unit 2316 in a well-known manner. Removable storage unit 2316 represents a magnetic tape, optical disk, or the like, which is read by and written to by removable storage drive 2312. As will be appreciated by persons skilled in the relevant art(s), removable storage unit 2316 includes a computer usable storage medium having stored therein computer software and/or data.

In alternative implementations, secondary memory 2308 may include other similar means for allowing computer programs or other instructions to be loaded into computer system 2300. Such means may include, for example, a removable storage unit 2318 and an interface 2314. Examples of such means may include a program cartridge and cartridge interface (such as that found in video game devices), a removable memory chip (such as an EPROM or PROM) and associated socket, a thumb drive and USB port, and other removable storage units 2318 and interfaces 2314 which allow software and data to be transferred from removable storage unit 2318 to computer system 2300.

Computer system 2300 may also include a communications interface 2320. Communications interface 2320 allows software and data to be transferred between computer system 2300 and external devices. Examples of communications interface 2320 may include a modem, a network interface (such as an Ethernet card), a communications port, etc. Software and data transferred via communications interface 2320 are in the form of signals which may be electronic, electromagnetic, optical, or other signals capable of being received by communications interface 2320. These signals are provided to communications interface 2320 via a communications path 2322. Communications path 2322 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2316 and 2318 or a hard disk installed in hard disk drive 2310. These computer program products are means for providing software to computer system 2300. Computer programs (also called computer control logic) may be stored in main memory 2306 and/or secondary memory 2308. Computer programs may also be received via communications interface 2320. Such computer programs, when executed, enable the computer system 2300 to implement the present disclosure as discussed herein. In particular, the computer programs, when executed, enable processor 2304 to implement the processes of the present disclosure, such as any of the methods described herein. Accordingly, such computer programs represent controllers of the computer system 2300.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

What is claimed is:
1. A method comprising:
   receiving, from a bit stream, a residual of a current block and an indication that the residual was determined based on a refined partition edge;
   selecting, based on a plurality of partitioning modes, an initial partition edge for partitioning the current block;
   determining, based on the indication and the initial partition edge, reference samples neighboring the current block;
   determining the refined partition edge based on the reference samples;

determining, based on at least one prediction mode, a prediction for two parts of the current block defined by the refined partition edge; and determining a reconstruction of the current block based on the residual and the prediction of the current block.

2. The method of claim 1, wherein the indication comprises a one-bit flag to indicate whether partition edge refinement is enabled or not.

3. The method of claim 2, wherein the indication further comprises an indication of the initial partition edge.

4. The method of claim 3, wherein the indication of the initial partition edge comprises an index representation of one of the plurality of partitioning modes.

5. The method of claim 4, wherein the plurality of partitioning modes comprises one or more of:
   a geometric partitioning mode;
   a multi-type tree splitting mode; or
   a quadtree splitting mode.

6. The method of claim 1, wherein the indication indicates one or more candidate edges determined based on the reference samples.

7. The method of claim 6, wherein the indication further indicates an edge detection method used to determine an edge in the reference samples.

8. The method of claim 7, wherein the edge is used to determine the refined partition edge.

9. The method of claim 1, wherein the determining the refined partition edge comprises:
   generating a plurality of edges based on the reference samples; and
   selecting an edge from the plurality of edges to refine the initial partition edge.

10. The method of claim 1, wherein the determining the refined partition edge comprises:
    generating an edge map from the reference samples;
    determining sets of positions for candidate edges in the reference samples; and
    refining the initial partition edge based on summing values of the edge map over the positions in each of the sets.

11. The method of claim 10, wherein the edge map is determined based on:
    a partial derivative in a horizontal direction;
    a partial derivative in a vertical direction; or
    a directional derivative.

12. A method comprising:
    selecting an initial partition edge for partitioning a current block based on a plurality of partitioning modes;
    determining, based on the initial partition edge, reference samples from neighboring blocks of the current block;
    determining a refined partition edge based on the reference samples;
    determining, based on at least one prediction mode, a prediction for two parts of the current block defined by the refined partition edge;

determining a residual based on a difference between samples of the current block and the prediction; and
    signaling, in a bit stream, the residual and an indication that the residual was determined based on the refined partition edge.

13. The method of claim 12, wherein the plurality of partitioning modes comprises one or more of:
    a geometric partitioning mode;
    a multi-type tree splitting mode; or
    a quadtree splitting mode.

14. The method of claim 12, wherein the signaling further includes signaling an indication of the initial partition edge.

15. The method of claim 13, wherein the reference samples are determined based on a distance of the reference samples from the initial partition edge.

16. The method of claim 12, wherein the determining the refined partition edge comprises:
    generating a plurality of edges based on the reference samples; and
    selecting an edge from the plurality of edges to refine the initial partition edge.

17. The method of claim 12, wherein the determining the refined partition edge comprises:
    generating an edge map from the reference samples;
    determining sets of positions for candidate edges in the reference samples; and
    refining the initial partition edge based on summing values of the edge map over the positions in each of the sets.

18. The method of claim 17, wherein the edge map is determined based on:
    a partial derivative in a horizontal direction;
    a partial derivative in a vertical direction; or
    a directional derivative.

19. The method of claim 17, wherein the initial partition edge is determined based on:
    an angle variable; and
    an offset variable.

20. A non-transitory computer-readable medium storing instructions that, when executed by one or more processors, cause the one or more processors to:
    determine, from a bit stream, a residual of a current block and an indication that the residual was determined based on a refined partition edge;
    select, based on a plurality of partitioning modes, an initial partition edge for partitioning the current block;
    determine, based on the indication and the initial partition edge, reference samples neighboring the current block;
    determine the refined partition edge based on the reference samples;
    determine, based on at least one prediction mode, a prediction for two parts of the current block defined by the refined partition edge; and
    determine a reconstruction of the current block based on the residual and the prediction of the current block.

* * * * *